US006851089B1

(12) United States Patent
Erickson et al.

(10) Patent No.: US 6,851,089 B1
(45) Date of Patent: Feb. 1, 2005

(54) SOFTWARE APPLICATION AND ASSOCIATED METHODS FOR GENERATING A SOFTWARE LAYER FOR STRUCTURING SEMISTRUCTURED INFORMATION

(75) Inventors: Stephan Erickson, Seattle, WA (US); Peter Norvig, Palo Alto, CA (US); Manish Arya, Bellevue, WA (US); Anand Rajaraman, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/426,418

(22) Filed: Oct. 25, 1999

(51) Int. Cl.[7] .............................................. G06F 15/00
(52) U.S. Cl. .......................................... 715/513; 707/3
(58) Field of Search ................................ 715/513, 517, 715/530; 717/146; 707/4, 5, 6

(56) References Cited

U.S. PATENT DOCUMENTS

| 5,737,592 | A | * | 4/1998 | Nguyen et al. ................. 707/4 |
| 5,826,258 | A | * | 10/1998 | Gupta et al. .................... 707/4 |
| 5,963,949 | A | | 10/1999 | Gupta et al. |
| 6,102,969 | A | * | 8/2000 | Christianson et al. ....... 717/146 |
| 6,424,980 | B1 | * | 7/2002 | Iizuka et al. ................. 715/513 |
| 6,515,682 | B1 | * | 2/2003 | Washington et al. ........ 345/762 |
| 6,516,308 | B1 | * | 2/2003 | Cohen .......................... 706/12 |
| 6,571,243 | B2 | * | 5/2003 | Gupta et al. .................... 707/6 |
| 6,587,969 | B1 | | 7/2003 | Weinberg et al. |
| 6,606,625 | B1 | * | 8/2003 | Muslea et al. ................. 707/6 |
| 6,611,498 | B1 | * | 8/2003 | Baker et al. ................. 370/252 |

OTHER PUBLICATIONS

Ashish, Naveen and Craig Knoblock. "Wrapper Generation for Semi–Structured Internet Sources", SIGMOD Record, vol. 26, No. 4, Dec. 1997.*

J. Hammer, H. Garcia–Molina, J. Cho, R. Aranha, A. Crespo, "Extracting Semistructured Information from the Web," Workshop on Management of Semistructured Data (PODS/SIGMOD'97), Tucson, Arizona, May 16, 1997.

N. Ashish and C. A. Knoblock, "Semi–automatic wrapper generation for internet information sources," Proceedings of the Second IFCIS International Conference on Cooperative Information Systems (CoopIS), Charleston, SC, 1997.

B. Adelberg, "NoDose—A Tool For Semi–Automatically Extracting Structured and Semistructured Data From Text Documents" Proceedings of ACM SIGMOD International Conference on Management of Data, 1998, pp. 283–294.

(List continued on next page.)

Primary Examiner—Joseph Feild
Assistant Examiner—Rachna Singh
(74) Attorney, Agent, or Firm—Knobbe, Martens, Olson & Bear LLP

(57) ABSTRACT

A wrapper builder application provides a variety of features for facilitating the creation of wrappers that are used to extract information from Web sites. In one aspect, the wrapper builder application provides a tool with which the process of creating a wrapper, which typically resembles coding, can be accomplished by a graphical design process involving drag and drop operations, clicking on objects, and filling in forms. A web viewer component provides a web browser frame, a source code frame, and a tree view frame, enabling the user to identify semistructured information of interest on Web sites. A wrapper editor component provides a graphical design environment in which a wrapper can be graphically constructed from operations and links. A wrapper model component provides a functioning internal representation of the graphically designed wrapper using Java objects and methods. A property editor component provides for the setting of properties that define the particular functionality of individual wrapper operations. A wrapper execution component provides features that enable the wrapper to be executed and debugged using a number of debugging tools. A wrapper serialization component provides a mechanism for storing and retrieving a wrapper for subsequent use and/or modification.

39 Claims, 30 Drawing Sheets

OTHER PUBLICATIONS

R. Doorenbos, O. Etzioni, and D. Weld, "A Scalable Comparison–Shopping Agent For The World–Wide Web" In Proceedings of the Frist International Conference on Autonomous Agents '97, ACM Press, 1997, pp. 39–48.

P. Maes, R. Guttman and A. Moukas, "Agents that Buy and Sell" Communications the ACM—Mar. 1999, vol. 42, No. 3, pp. 81–91.

Internet article entitled: "Level 1 Document Object Model Specification" Version 1.0, W3C Working Draft 20, Jul., 1998.

Internet article entitled: "Dynamic Queries and Query Previews for Networked Information Systems: The Case of NASA EOSDIS, " pp. 1–5.

Internet article entitled: "WebTOC: A Tool To Visualize and Quantify Web Sites Using A Hierarcical Table of Contents" pp. 1–2. (Undated, printed on Dec. 9, 1999).

Internet article entitled: "Data Flowing Diagramming," Applied Information Science, dated Feb. 16, 1996.

Internet article entitled: "The Technique of Data Flow Diagramming," Kenneth A. Kozar, Spring 1997.

Internet article entitled: WEBSQL: An SQL–Like Query Language for the World Wide Web. (Undated, printed on Dec. 9, 1999).

T. Kistler and H. Marais, "WebL—A Programming Language for the Web" SRC Technical Note, 1997, Dec. 1, 1997.

* cited by examiner

Properties For For Rent

California

Nevada

FIG. 3A

California Properties For Rent

Bay Area

Los Angeles

FIG. 3B

Bay Area Properties For Rent

Condos

Palo Alto 2 BR/1 BA with sunny dining area and new carpeting. $1200/mo.

Los Altos Terrific views from this end unit. Only $1500/mo if you respond to this ad before 9/15

Apartments

Menlo Park 3 BR/1 BA with washer/dryer hookups. $1000.

Palo Alto Conveniently located in downtown Palo Alto next to the train station No Pets. 1 BR/1 BA.

*FIG. 3C*

```
<HTML>
<BODY>
<H1>Properties For Rent</H1>
<P><A HREF="calif.htm">California</A></P>
</BODY>
</HTML>
```

FIG. 4A

```
<HTML>
<BODY>
<H1>California Properties For Rent</H1>
<P><A HREF="bayarea.htm">Bay Area</A></P>
<P><A HREF="la.htm">Los Angeles</A></P>
</BODY>
</HTML>
```

FIG. 4B

```
<HTML>
<BODY>
<H1>Bay Area Properties For Rent</H1>
<H2>Condos</H2>
<B><P>Palo Alto</B> 2 BR/1 BA with sunny dining area and new carpeting.
$1200/mo. </P>
<B><P>Los Altos</B> Terrific views from this end unit. Only $1500/mo if you
respond to this ad before 9/15. </P>
<H2>Apartments</H2>
<B><P>Menlo Park</B> 3 BR/1 BA with washer/dryer hookups. $1000. </P>
<B><P>Palo Alto</B> Conveniently located in downtown Palo Alto next to the train
station. No Pets. 1 BR/1 BA. </P>
</BODY>
</HTML>
```

FIG. 4C

```
# create the PROPERTIES table
sql('CREATE TABLE PROPERTIES (
STATE VARCHAR (100),
REGION VARCHAR (100),
5 CITY VARCHAR (100),
PROPERTYTYPE VARCHAR (100),
PRICE NUMBER'
)

10 # bind the wrapper variable to columns in the table
bindColumn (PROPERTIES.STATE to STATE)
bindColumn (PROPERTIES.REGION to REGION)
bindColumn (PROPERTIES.CITY to CITY)
bindColumn (PROPERTIES.PROPERTYTYPE to PROPERTYTYPE)
15 bindColumn (PROPERTIES.PRICE to PRICE)

# bind the wrapper variables to extraction functions
bindExtractionFunction ('amazon.util.ExtractPrice' to PRICE)
```

FIG. 6

```
Debug Frame                                        [_][□][X]

| Site Overview | HTML/Source | Variables | Listing View |

<HTML>
<BODY>
<H1>Bay Area Properties For Rent</H1>
<H2>Condos</H2>
<B><P>Palo Alto</B> 2 BR/1 BA with sunny dining area and new carpeting.
$1200/mo. </P>
<B><P>Los Altos</B> Terrific views from this end unit. Only $1500/mo if you
respond to this ad before 9/15. </P>
<H2>Apartments</H2>
<B><P>Menlo Park</B> 3 BR/1 BA with washer/dryer hookups. $1000. </P>
<B><P>Palo Alto</B> Conveniently located in downtown Palo Alto next to the train
station. No Pets. 1 BR/1 BA. </P>
<BODY>
</HTML>
```

FIG. 9B

Debug Frame

| Site Overview | HTML Source | Variables | Listing View |

TEXT: '<HTML><BODY><H1>California Properties For Rent</H1><P><A HREF="bayarea.htm">Bay Area</A></P><P><A HREF="la.htm">Los Angeles</A></P><BODY></HTML>'
URL: 'http://www.rentals.com/calif.htm'
START: 0
END: 144
STATE: 'California'

FIG. 9C

| Debug Frame | | |
|---|---|---|
| Site Overview | HTML Source | Variables | Listing View |

PROPERTIES.STATE (STATE): California
PROPERTIES.REGION (REGION): Bay Area
PROPERTIES.CITY (CITY): Palo Alto
PROPERTIES.PROPERTYTYPE (PROPERTYTYPE): Condos
PROPERTIES.PRICE (PRICE): 1200

FIG. 9D

```
TEXT:    '<HTML><BODY><H1>Bay Area Properties For
         Rent</H1><H2>Condos</H2><B><P>Palo Alto</B> 2 BR/1 BA
         with sunny dining area and new carpeting. $1200/mo.
         </P><B><P>Los Altos</B> Terrific views from this end
         unit. Only $1500/mo if you respond to this ad before
         9/15. </P><H2>Apartments</H2><B><P>Menlo Park</B> 3
         BR/1 BA with washer/dryer hookups. $1000.
         </P><B><P>Palo Alto</B> Conveniently located in
         downtown Palo Alto next to the train station. No Pets.
         1 BR/1 BA. </P></BODY></HTML>'
URL:     'http://www.rentals.com/bayarea.htm'
START:   82
END:     145
STATE:   'California'
REGION:  'Bay Area'
PROPERTYTYPE: 'Condos'
LISTINGS: '<P>Palo Alto</B> 2 BR/1 BA with sunny dining
         area and new carpeting. $1200/mo. </P><b><P>Los
         Altos</B> Terrific views from this end unit. Only
         $1500/mo if you respond to this ad before 9/15. </P>
CITY:    'Palo Alto'
LISTING: ' 2 BR/1 BA with sunny dining area and new
         carpeting. $1200/mo. '
PRICE:   1200
```

*FIG. 10A*

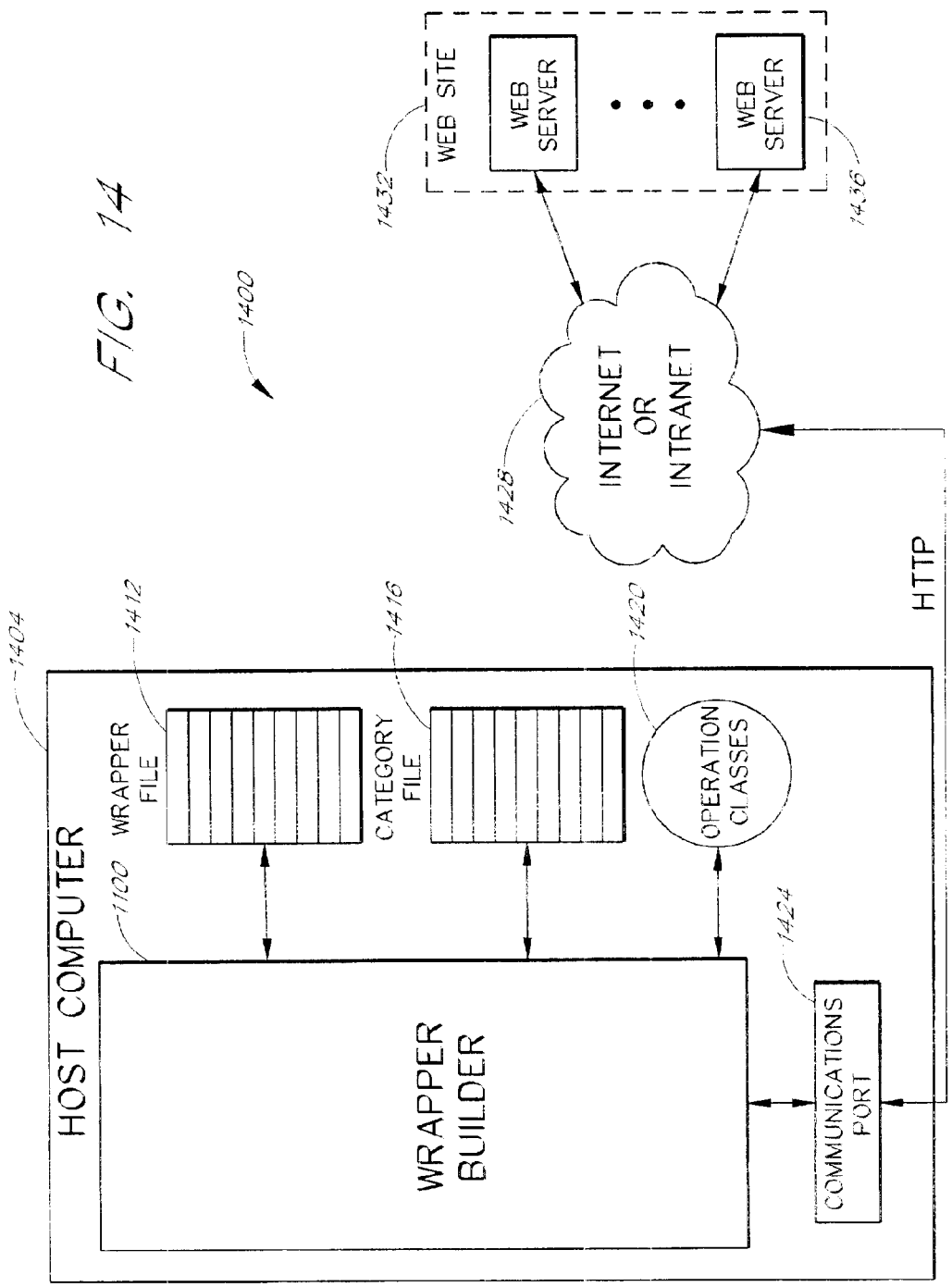

SOFTWARE APPLICATION AND ASSOCIATED METHODS FOR GENERATING A SOFTWARE LAYER FOR STRUCTURING SEMISTRUCTURED INFORMATION

APPENDICES

This specification includes a computer program listing appendix submitted on two identical compact disks containing a partial source code listing of a preferred embodiment of the invention. Each compact disk contains the following text files, which were created on May 24, 2004, and which represent, respectively, Appendices A-E of the present application: AppendixA.txt (14.9 Kbytes). AppendixB.txt (5.69 Kbytes). AppendixC.txt (9.33 Kbytes). AppendixD.txt (5.42 Kbytes), and AppendixE.txt (3.6 Kbytes). These materials form a part of the disclosure of the specification, and are incorporated by reference herein. The copyright owner has no objection to the facsimile reproduction of this code listing as part of this patent document, but reserves all other copyrights whatsoever.

FIELD OF THE INVENTION

This invention relates to the structured access of semistructured information. More specifically, the invention provides an application and associated methods for creating software layers, or wrappers, that extract and/or structure semistructured information available on the World Wide Web.

DESCRIPTION OF THE RELATED ART

The World Wide Web ("Web") provides access to a vast amount of information accessible through Web browser equipped computers connected to the Internet. Information, such as weather forecasts, government publications, stock prices, and prices for everyday products, has become more easily and conveniently available than ever before.

Information on the Web is typically provided in the form of Hypertext Markup Language ("HTML"). HTML documents are coded documents that can be displayed by Web browsers such as Netscape Navigator or Microsoft Internet Explorer. When displayed on a Web browser, HTML produces a visual depiction of a document in its intended format. The HTML specification defines a language with a definite structure and format, enabling HTML code to be universally interpreted and displayed by all Web browsers.

While the HTML specification imposes some limitations on the structure of HTML code, there is a substantial degree of latitude in how information is coded and displayed. This degree of latitude allows creativity and originality in creating HTML documents. Such creativity and originality can easily be interpreted and appreciated by the human end user.

Once the creative step of designing a Web page has been exercised, the Web page author often retains the same basic structure of the Web page in making future modifications. Suppose, for example, a Web page displays the current weather conditions in Seattle, Wash. The current temperature will likely be listed somewhere on this page. Likewise, the HTML code that renders the temperature on the displayed page will be located somewhere within the HTML document. It may be the case that the number representing the temperature is always located just after the word "temperature" in the HTML code. Thus, there is a positional relationship between the temperature data of interest and the word "temperature" within the HTML document.

Semistructured information is information that as a whole does not have a precise structure. The format of semistructured information may be represented by regular expressions, typically nested regular expressions. A Web site that maintains some degree of similar structure, even though the data represented thereon continually changes, contains semistructured information. The accessing of data within semistructured information by a machine process typically requires the matching of regular expressions. Elements within semistructured information typically have meanings based upon their location or surroundings within the semistructured information. The information in Web sites can often be described as semistructured information.

Structured information, as opposed to semistructured information, imposes a definite organization upon and relationship between units of data. Structured information is typically represented in tables of relational databases. The accessing of structured data can be accomplished by a row-column table lookup, which is a much simpler, faster, and more easily defined process than that required for corresponding semistructured information. One method by which structured information can be accessed is through the Structured Query Language (SQL). SQL is widely used in the database industry for creating, modifying, and accessing structured information contained in relational databases.

A wrapper is a software layer that functions to provide automated access to semistructured information. Wrappers can be configured to translate semistructured information into structured information. For example, a wrapper may enable information stored on a Web page to be accessed through an SQL query. To do this, a wrapper may, upon receiving a request for information, fetch an HTML document, extract the relevant information, and provide the extracted information as the result of the SQL query. Alternatively, a wrapper could access a Web site, then extract and catalog the semistructured information of interest in a relational database. The relational database could then be queried using SQL.

A wrapper is generally tailored to function on a specific format of semistructured information. Thus, each Web site containing semistructured information of interest in a particular format will likely require the creation of a separate wrapper. Wrappers are typically created by human authors after reviewing the semistructured information. The author then writes a program or wrapper typically using nested regular expressions to extract the information of interest.

A wrapper may also provide a mapping function, which acts to transform extracted data into another format. For example, after extracting the current temperature in Fahrenheit degrees in Seattle, Wash., the wrapper may convert this temperature to Celsius during the translation process.

Wrappers are discussed in U.S. Pat. No. 5,826,258 (the '258 patent) issued on Oct. 20, 1998 to Gupta et al. The '258 patent provides useful background information for the understanding of the present invention.

SUMMARY OF THE INVENTION

The present invention provides a software application and associated methods that facilitate the design and creation of wrappers. In a preferred embodiment, created wrappers are capable of the automated extraction of data from Internet or intranet Web sites. The application runs on a network-connected PC or workstation supporting Java applications and the standard protocols and conventions of the World Wide Web.

In the preferred embodiment, the application provides a graphical design environment in which a wrapper can be created from operations and links. Functionally, operations represent actions that a wrapper can perform. Links define the order in which the actions are performed. Visually, each operation is represented as a circle, and each link is represented as a directed arrow from one operation to another. Each operation in a wrapper is an individual instantiation of a number of basic operation types that are provided by the application A pop-up property editor dialog box allows the functionality of each operation to be customized. Within the graphical design environment, a wrapper can be created using drawing program-like features such as clicking and filling in dialog boxes in lieu of a process that typically would resemble coding.

In the preferred embodiment, the application also provides a visual run and debug environment that operates in conjunction with the graphical design environment. The run and debug environment provides a number of tools for starting, stopping, setting breakpoints in, and stepping through a wrapper's execution. The execution of the wrapper is visually depicted by highlighting the wrapper's components within the graphical design environment. A number of additional tools are also provided, such as, for example, tables and windows for viewing wrapper variables, wrapper input, and wrapper output.

In the preferred embodiment, a wrapper is internally represented using a number of Java objects, each of which is an instantiation of a Java class. Operation classes provide methods that implement the functionality common to each of a number of basic operation types. Additional operation classes can be coded and linked into the application, extending the number of basic operations from which wrappers can be constructed. Once a wrapper has been constructed through the graphical design environment and represented internally, the wrapper can be saved for subsequent execution or editing through the process of serialization.

In the preferred embodiment, the application also provides a Web viewer with which the user can browse Web sites for information of interest while creating a wrapper. The viewer comprises a browser frame showing rendered HTML, an HTML source code frame, and a tree view frame showing a hierarchy of Web links.

BRIEF DESCRIPTION OF THE DRAWINGS

Referring now to the drawings in which like reference numbers represent corresponding components throughout:

FIGS. 3A–C illustrate a rendering of a simple hypothetical Web site;

FIGS. 4A–C illustrate the associated HTML code that produces the Web site illustrated in FIGS. 3A–C;

FIG. 6 illustrates an example category file;

FIGS. 9A–D illustrate the various displays of the debug frame provided by the wrapper builder application;

FIG. 10A illustrates an example execution environment;

FIG. 13A illustrates the process by which a wrapper model is created in a preferred embodiment of the present invention;

FIG. 14 illustrates one embodiment of a system in which the wrapper builder application can operate.

DETAILED DESCRIPTION OF THE PREFERRED EMBODIMENT

A preferred embodiment of the invention will now be described with reference to the accompanying drawings. It is to be understood that other embodiments may be utilized and changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent components and methods to those described herein. In other instances, well-known methods, procedures, components, and devices have not been described in detail so as not to unnecessarily obscure aspects of the present invention.

The detailed description that follows is organized into the following sections:
I. Functional Overview
II. Functional Description
III. Example Wrapper
IV. Wrapper Builder Implementation
V. Wrapper Systems
I. Functional Overview The present invention provides a variety of software related features for facilitating the creation of wrappers. In the preferred embodiment, these software features are embodied in an application referred to herein as the "wrapper builder." The following overview describes, at a high level, how the wrapper builder application is used to create a wrapper.

Figure 1:
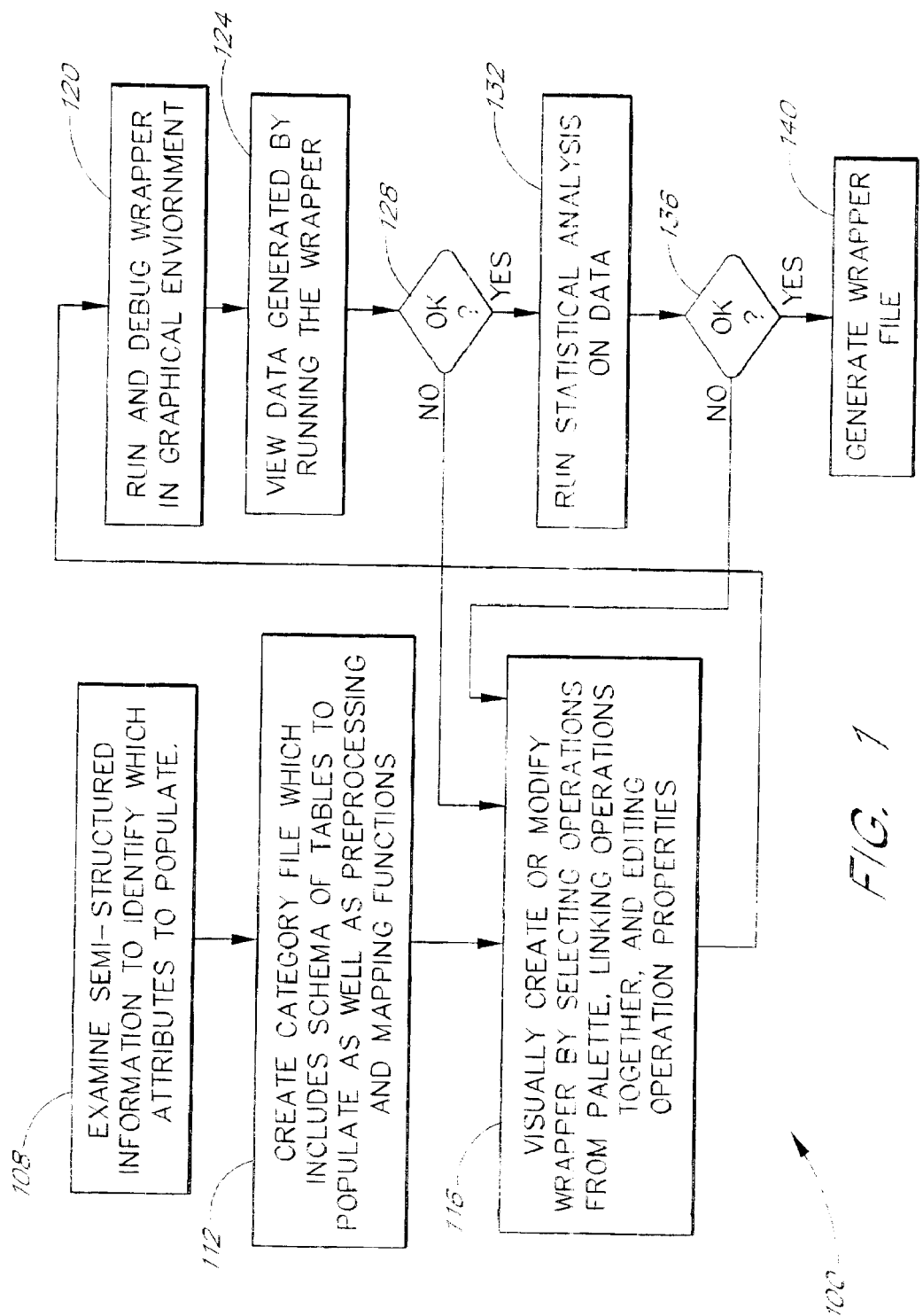
FIG. 1 illustrates a flowchart of one embodiment of the wrapper creation process.
Figure 2:
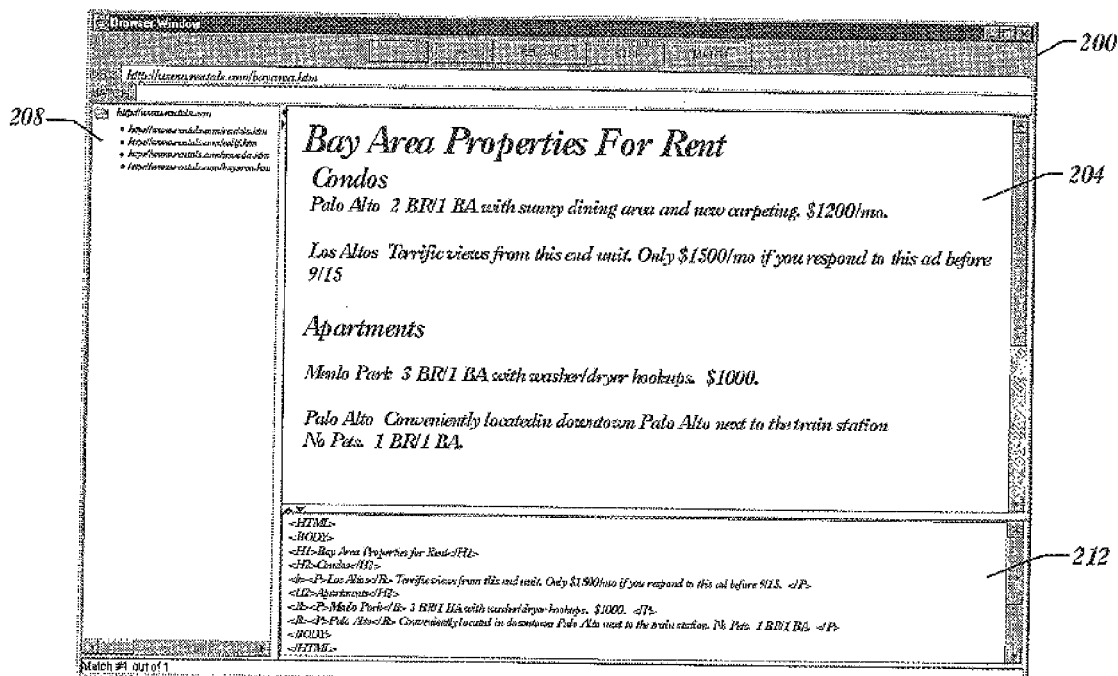
FIG. 2 illustrates the Web viewer aspect of the wrapper builder application.

FIG. 1 illustrates a flowchart 100 of the process by which a wrapper is created. At the first step 108, the user of the wrapper builder program (the "user") examines Web pages to identify information of interest. Step 108 is facilitated through the wrapper builder's Web viewer 200 as depicted in FIG. 2.

At this point, it may help to review a simple example of the first step 108 of the process of creating a wrapper. FIGS. 3A–C illustrate a rendering of a very simple Web site, which might contain data of interest to the user, as it would be displayed by the Web browser 204. FIGS. 4A–C illustrate the associated HTML code that results in the rendered pages of FIGS. 3A–C. The user must decide what information available on the site is of interest and how to associate it. The Web site in FIGS. 3A–C, for example, might be an online listing of rental properties. The user may decide to traverse links among the pages of the Web site to get a feel for the information available. Some of the information of interest can be found on the pages displayed in FIGS. 3A and 3B, while most of the relevant information is displayed on the page in FIG. 3C.

Figure 5:
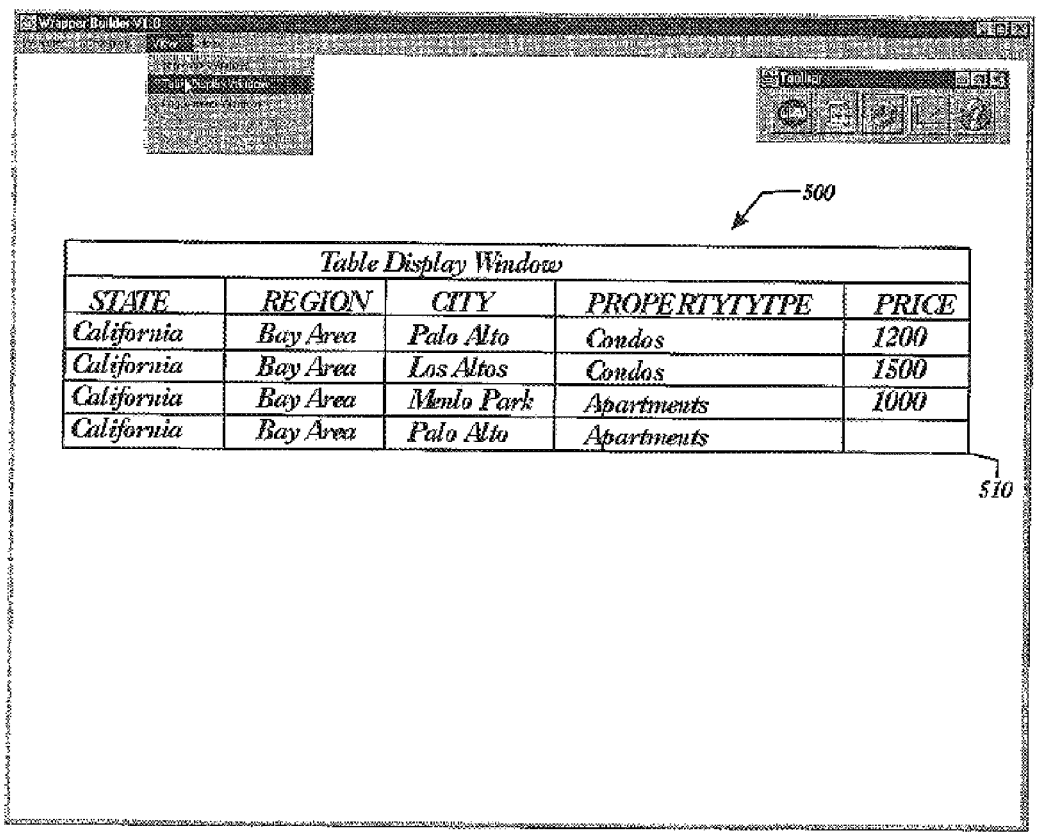
FIG. 5 illustrates the table display window of the wrapper builder application.

Once the user has determined what data is available, the user may decide to associate the data as shown in the table 510 of FIG. 5. According to FIG. 5, the user decided that there were five classes of data of interest, namely, state, region, city, propertytype, and price. Furthermore, the user decided that the information for each rental should be in one line of the table 510.

The table 510, containing the relevant information from the Web site in a structured format, could be created manually each time the Web page is updated by having a person review the Web page and enter information into the table. On the other hand, a user could create a wrapper to perform this task automatically. In creating the wrapper, the user specifies a sequence of operations that automatically extract the information of interest from a Web site and enter the information into the table 510.

Referring back to the flowchart 100 in FIG. 1, the next step 112 is the creation of a category file. Once the user has identified data of interest on a Web page and decided upon an organization or format for the data, the user describes the organization in a manner that can be understood by the wrapper. In the preferred embodiment, a category file specifies the tabular format of the information of interest, associations between wrapper variables (to be discussed below) and columns of the table 510, and also any applicable mappings or functions that are to be applied to wrapper variables as the variables are entered into the table 510.

An example category file 600 is illustrated in FIG. 6. By reading the category file 600, the wrapper is able to output the data of interest in the form of SQL commands that define the table 510. Lines 2–8 specify the desired tabular format in which the user would like the wrapper to output the data of interest. In particular, lines 2–8 define a table titled PROPERTIES with four 100 character columns titled STATE, REGION, CITY, and PROPERTYTYPE, in addition to a fifth row holding a number titled PRICE. Lines 11–15 define associations between wrapper variables and column titles. Wrapper variables will be discussed in detail below. For example, line 11 associates the wrapper variable STATE with the column STATE in the PROPERTIES output table 510. Lastly, line 18 defines a transformation that will be associated with the wrapper variable PRICE. Line 18 will cause the wrapper to run the Java function "amazon.util.ExtractPrice" upon the input text of an operation (operations will be discussed in detail below) to extract a price.

A category file is so named because any semistructured data that is to be organized using the same tabular format, wrapper variable associations, and mappings can be considered to be of the same category. For example, a user might create a category file named properties.cat for information on rental properties. Thus, the category file would specify the tabular format of the attributes for all rental properties of interest. Although all rental properties might share the same attributes, those attributes will likely be structured in different ways on different Web sites. Therefore, a user can write a wrapper for each Web site but use one category file for all the wrappers.

At step 112, the category file can be created using a text editor or another tool, such as, for example, an interactive category file creation program. The tool used to create the category file can be incorporated into the wrapper builder program. Upon creating the category file, the user saves the category file for later use and association with individual wrappers. The user can also open up an existing category file and edit it or modify and save it as another category file.

Figure 7:
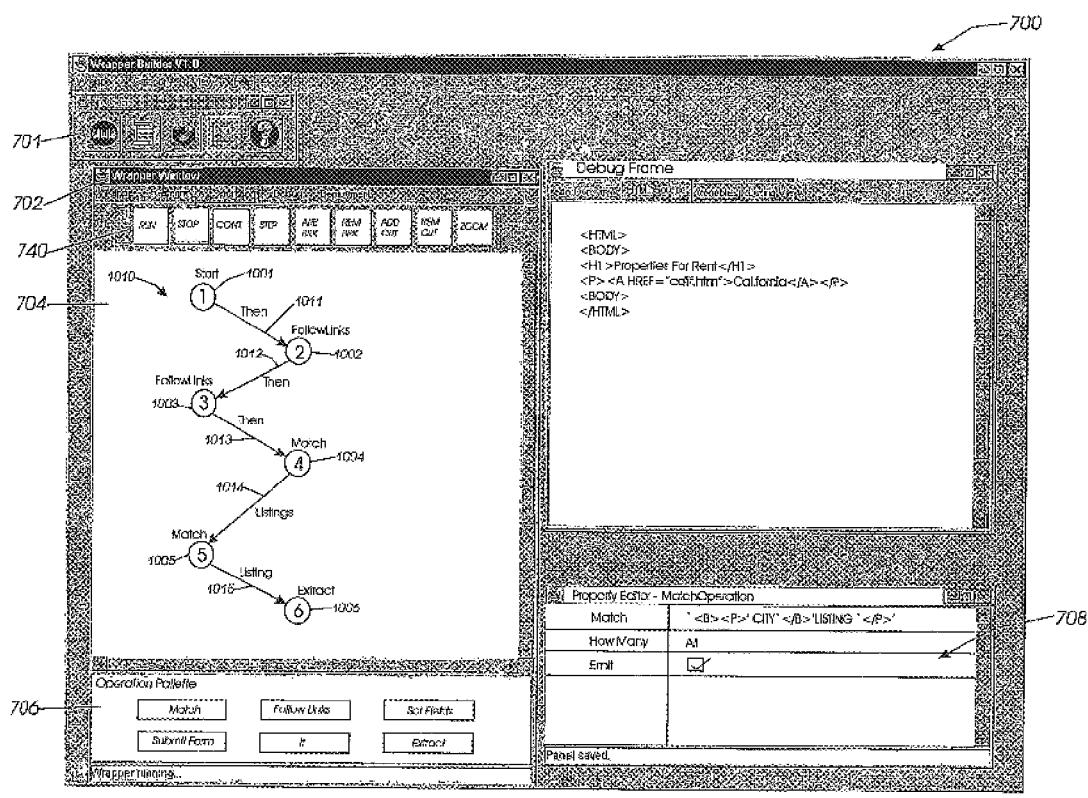
FIG. 7 illustrates the visual wrapper design environment provided by the wrapper builder application.

Once the user has created the category file, the user can then begin the process of constructing the wrapper at step 116 of flowchart 100. The wrapper is created in the wrapper editor 702 as illustrated in FIG. 7. A wrapper consists of a series of operations 1001–1006 that are linked together by a number of calls in a directed call graph 1010. Visually depicted, each operation is represented as a circle, and each call is represented as a directed link from one circle to another.

In alternative embodiments, other shapes, geometrical configurations, or formats could be used to represent the sequence of operations and links in the call graph 1010. One alternative embodiment, for example, could comprise a table. Each row of the table could represent one operation. Column entries in each row could represent calls to other operations in the form of row references.

On a functional level, the wrapper carries out each of the operations 1001–1006 in the order defined by the call graph 1010. Each operation can be customized by defining a number properties associated with the operation. Properties can include such things as a URL from which to fetch a page, a value to be submitted in a form, or a complex conditional expression involving input text and user-defined variables. Operations will be discussed in more detail below in the section titled WRAPPER OPERATIONS.

Once a wrapper has been created, it is run and debugged at step 120 of flowchart 100. FIG. 7 also illustrates the graphical environment in which the wrapper can be run and debugged. The environment includes several tools for running, starting, stopping, and stepping through the execution of the wrapper. FIGS. 9A–D illustrate other tools for checking the proper operation of the wrapper that can be displayed in the wrapper run/debug environment.

Once the wrapper has been debugged, the wrapper is run at step 124 of flowchart 100. The results of the wrapper execution are displayed in a table display window 500 as illustrated in FIG. 5. The actual output of a wrapper is typically a sequence of SQL commands that populate a relational database with data. Within the wrapper builder nm/debug environment, however, the output of the wrapper is also displayed directly in tabular format as illustrated in FIG. 5.

At step 128 of flowchart 100, the user determines whether the wrapper has functioned satisfactorily by examining the tabular output. If the wrapper has not functioned satisfactorily, then steps 116, 120, and 124 are repeated until satisfactory data is produced by the wrapper. If the user determines that the data produced by the wrapper is satisfactory at step 128, then control is passed to step 132 of flowchart 100. At step 132, a statistical analysis and error detection process is preferably run on the data produced by the wrapper to further determine whether the wrapper has yielded satisfactory data. At step 136, if the wrapper has not performed satisfactorily, then steps 116, 120, 124, 128, and 132 are repeated until satisfactory data and wrapper execution are achieved.

Once it has been determined that the wrapper is satisfactory at step 136, then the wrapper builder generates a wrapper file from the internal representation of the wrapper, at step 140. The wrapper file can be constructed using a process called serialization. The wrapper file can then be interpreted by a wrapper execution engine or compiled and executed.

II. Functional Description

This section describes the functionality of the various aspects of the wrapper builder application as viewed from the user's perspective. The implementation of the wrapper builder application will be discussed in a subsequent section.

A. Main Desktop

FIG. 7 illustrates a screen that includes the main desktop 700 of the wrapper builder application. The main desktop 700 contains the main menus for the wrapper builder graphical user interface including the following:

Wrapper—consisting of Open, Close, Save, and New commands for wrappers, as well as a Quit option for terminating the wrapper builder application.

Category—supports Open, Save, Close, and New for wrapper categories.

View—allows the user to open a Web Viewer, Listing Viewer, Log Viewer or bring any window to the foreground.

Help—provides a help page.

In addition to the main menus, the main window also displays a toolbar 701 containing buttons for some frequently used commands.

B. Web Viewer

The Web viewer 200, as illustrated in FIG. 2, is used to view Web information. The viewer 200 includes a browser frame 204, an HTML source frame 212, and a site overview frame 208. The browser frame 204 displays rendered HTML, the source frame 212 displays the corresponding source, and the site overview frame 208 displays a tree representation of the site, with the currently visited URL being highlighted. The browser frame 204, source frame 212, and site overview frame 208 are displayed as split panes, and are linked together such that when one frame receives user input, the other two frames are automatically updated.

The Web viewer 200 has typical buttons such as back, forward, stop, and reload. A URL text box allows a URL to be entered upon which the corresponding page will be displayed. The viewer 200 also has a text box that allows a match expression to be entered (match expressions will be described in detail below). Upon clicking on the match button, the viewer 200 will then show the results of the match expression in the browser frame 204. The browser frame 204 functions in conjunction with the HTML source frame 212. If text is highlighted in the browser frame 204, the corresponding text will also be highlighted in the source frame 212. The browser frame 204 also functions in conjunction with the site overview frame 208 that shows an overview of the pages in a Web site.

In the preferred embodiment, the browser frame 204 displays a menu bar with the following menus:

File—consisting of Open, Open in New Window, Save, Print, Close, and Exit operations.

Edit—consisting of Copy, Select All, Find, and Preferences and operations.

Go—consisting of Back and Forward operations in addition to a history list of

Help—provides help pages.

The HTML source frame 212 displays source HTML of the Web page displayed in the browser frame 204 formatted in a user-friendly fashion. Clicking on a link within the source frame 212 causes the link to be loaded by the Web viewer 200. As described above, when a user selects a region of text in the browser frame 204, the corresponding region appears highlighted in the source frame 212.

The tree view frame 208 displays an overview of the pages in the site as a trace while the wrapper is executing, or while the user is exploring. Each node in the tree view frame 208 represents one Web page and has a title that shows the URL of the node. The tree view frame 208 provides a number of tree control actions (expand, contract, etc.) as are well known in the art. In one embodiment, upon loading a Web page, the tree view frame 208 will display all of the links contained in the Web page. In another embodiment, the tree view frame 208 displays links when the user follows a link while browsing or when a wrapper follows a link during execution. The node being displayed by the Web viewer 200 is highlighted in the tree view frame 208.

C. Wrapper Editor

As illustrated in FIG. 7, the wrapper builder provides a graphical design environment for creating wrappers. Within the graphical design environment, wrappers can be constructed using drag and drop operations, clicking on objects, and filling in forms. As opposed to other methods of wrapper creation, use of the wrapper builder does not require programming skills.

In the preferred embodiment, a wrapper consists of a series of operations that are linked together by links in a call graph. Visually, each operation is represented as a circle, and each link is represented as a directed arrow from one operation to another. The operation at the tail of a link is referred to as the source operation, while the operation at the head is referred to as the destination operation for that particular link.

Functionally, operations specify the action to be taken at each step by the wrapper upon execution. Links determine the sequence in which the operations are performed. From another perspective, an operation can be viewed as a function to be performed by the wrapper. A link can be viewed as a function call of the destination operation by the source operation.

By using a graphical representation of functions as circles and calls as links, a sequence of function calls can be effectively created and edited by the user without the need to view the underlying wrapper code. In this manner, a process, which typically involves or resembles coding, is transformed into a construction of a graphical representation.

Each operation is customized by filling in values for its properties. Properties can include such things as a URL to fetch from, a value to be entered into a form, or a complex conditional expression involving input text and user-defined variables. Operations, links, and properties will be discussed in greater detail below.

The wrapper editor 702 includes a wrapper graph canvas 704 on which the wrapper is graphically designed. The wrapper editor 702 also includes an operation palette 706 that displays available operations. Available operations are discussed below in the section titled "WRAPPER OPERATIONS." Wrapper operations 1001–1006 are created by dragging available operations from the operation palette 706 to the wrapper canvas 704. In alternative embodiments, new operations can be selected from a pull down menu or list. Within the circle representing each operation is its name. In this case operations 1001–1006 are named "1" through "6" respectively. The user can name operations for the purpose of identification during debugging.

Once the operations 1001–1006 have been placed on the wrapper graph canvas 704, the operations 1001–1006 can be linked by right clicking on the source operation and then selecting the destination operation. A directed link is then shown going from the source operation to the destination operation. Thus, a directed graph can be created from the operations 1001–1006. Each link displays a label that is associated with it by its corresponding source operation.

The characteristics of each operation determine the result of creating a directed link for which that operation serves as the source. For example, a start operation 1001 can serve as the source for one other destination operation 1002. The start operation 1001 identifies a link 1011 by which it is associated with a destination operation 1002 using the generic title "Then." Functionally, the start operation 1001 reads a Web page and then calls its singular destination operation 1002.

A Match operation 1004, 1005, has links, each of which is associated with a particular wrapper variable (wrapper variables will be discussed below). Therefore, the links following the Match operations 1004, 1005 can be given the title of the wrapper variable, such as, for example, "Listings" or "Listing" as with links 1014, 1015. Each operation will be discussed in greater detail below.

A menu bar at the top of the wrapper window provides the following menus:

Wrapper—operations include open, new, save, save as, close and exit for wrappers.

Category—a list of available category files to associate with the open wrapper.

Operation—a set of operation management tools including Import Operation.

Debug—provides a set of debug operations including, Restart Wrapper, Stop Wrapper, Resume Wrapper, Step Into, Insert Cutpoint, Remove Cutpoint, Insert Breakpoint, Remove Breakpoint. A cutpoint allows a wrapper to be executed up to the cutpoint without executing subsequent operations. The other operations available in the Debug menu are well known in the art.

Deployment—this menu provides features to set up the wrapper for use upon completion of the wrapper.

A property editor 708 is a pop up dialog box that allows the properties of each operation to be defined once the operation has been added to the wrapper graph canvas 704. The property editor 708 can be displayed by double clicking on an operation. Properties can include such things as a URL to fetch from, a value for a form, or a complex conditional expression involving input text and user-defined variables. Properties will be discussed in greater detail below.

D. Wrapper Operations

As mentioned in the previous subsection, wrappers are constructed of operations (e.g. operations 1001–1006) and links (e.g. links 1011–1016) between operations. Visually, operations are depicted as circles with some identifying information. Links are depicted as directed arrows.

1. Execution Environment

During the execution of the wrapper, each operation can access one or more environments. As will be described below, operations employ variables during their execution. An environment is a set of variable-value bindings visible to an operation during its execution. As illustrated by example in FIG. 9C, variables 931–935 are bound to values 941–945 in execution environment 930.

An operation can create variables, assign values to variables, and read the values of variables within an environment to which it has access. In general, a destination operation is passed an environment, consisting of a set of variable-binding pairs, from the source operation. Upon the completion of the execution of a destination operation, it will return an environment, consisting of a set of variable-binding pairs, to the source operation.

In the present embodiment, one environment is used by all of the operations in a wrapper. Thus, all operations effectively access wrapper variables in a global environment. The concept of a global environment is well understood in the art. By using a global environment, a source operation will have access to any variables bound by a destination operation once the destination operation has been completed. The use of only one environment is a result of the functionality of the operations from which the wrapper is constructed. In the present embodiment, the same environment that is passed into an operation is always returned by the operation. In the present embodiment, this same environment is also always passed on to destination operations and returned therefrom.

In alternative embodiments, operations can be constructed to create new environments, copy wrapper variables from one environment to another, and access wrapper variables in different environments. In this manner, multiple environments can be created.

It should be noted that the use of a global environment in the present embodiment applies only to wrapper variables. Wrapper variables and the associated environment in which they are bound are quite distinct from the underlying variables used by the functions or methods that implement wrapper operations in Java code. The implementation of operations in the present embodiment uses the various scopes of variable bindings provided by the object oriented Java programming language. The implementation of the wrapper operations in Java will be discussed below in the section titled "Wrapper Builder Implementation."

2. Input and Output Variables

Whether two operations can be linked is determined in part by compatibility of input and output variables. The output variables of a source operation are those variables that the source operation will bind in the environment it passes to a destination operation. Each destination operation can have a set of input variables that must be bound in the environment passed to it by the source operation. In the preferred embodiment, to link two operations, the destination operation's input variables must be included in the source operation's output variables.

The output variables of each operation will be described below. In most cases, operations will have the following set of standard input variables:

TEXT—the input text. The input text typically consists of the complete text of the Web page upon which the destination operation is to be performed. The text is represented as a sequence of characters.

URL—the URL of the input text.

START—the start position within the input text. The input text consists of a sequence of characters that are numbered starting from 0. The start position denotes the number of the character in the input text at which the destination operation should start its processing. Thus, the destination operation need not be performed on the whole input text. It will often be the ca se that the destination operation will only be performed on a portion of the input text.

END—the end position within the input text. The end position denotes the number of the last character of the input text that the destination operation should process.

3. Operation Properties

Operations also include properties, or user defined values that are set upon the creation of the operation. Properties are set and edited using the property editor dialog box 708 as illustrated in FIG. 7 and discussed above. Properties define the particular functionality or characteristics of each operation and can include the specification of match expressions, links or calls to other operations, or other instructions particular to the operation that can be defined at the time of wrapper creation.

In the preferred embodiment, one property that all operations have is the NAME property. The NAME property simply allows the user to give each operation an identifying name. This feature is primarily of use in the context of debugging a wrapper but is not essential to the operation of the present invention.

4. Basic Operations

Each wrapper operation is designed to mimic an action that a person would take in extracting data from a Web site. Thus, to design a wrapper, a user simply creates the appropriate operations and links them together such that they execute in the desired sequence.

Each operation is of a particular type or class, for example, a Start operation or a Match operation. Alternatively, the various types or classes of operations can be referred to as available operations in constructing a wrapper. Each class of operation has general functional characteristics that are shared by all operations of that class. The particular functionality of each individual operation, however, is determined by its location in the wrapper graph and the properties assigned to that operation.

The basic classes or types of operations available to the wrapper user can include the following: Start, Match, Follow Links, Set Fields, Submit Form, If, and Extract. Each class/type of operation will be described in detail below.

a. Start Operation

| | |
|---|---|
| Input Variables: | Not applicable. |
| Output Variables: | TEXT - set to the complete text of the start URL. |
| | URL - the origin of the TEXT. |
| | START - set to 0. |
| | END - set to the length of TEXT minus 1. |
| Properties: | URL - the URL at which to start the wrapper. |
| Destination Operations: | THEN - the one destination operation. |

Figure 8A:
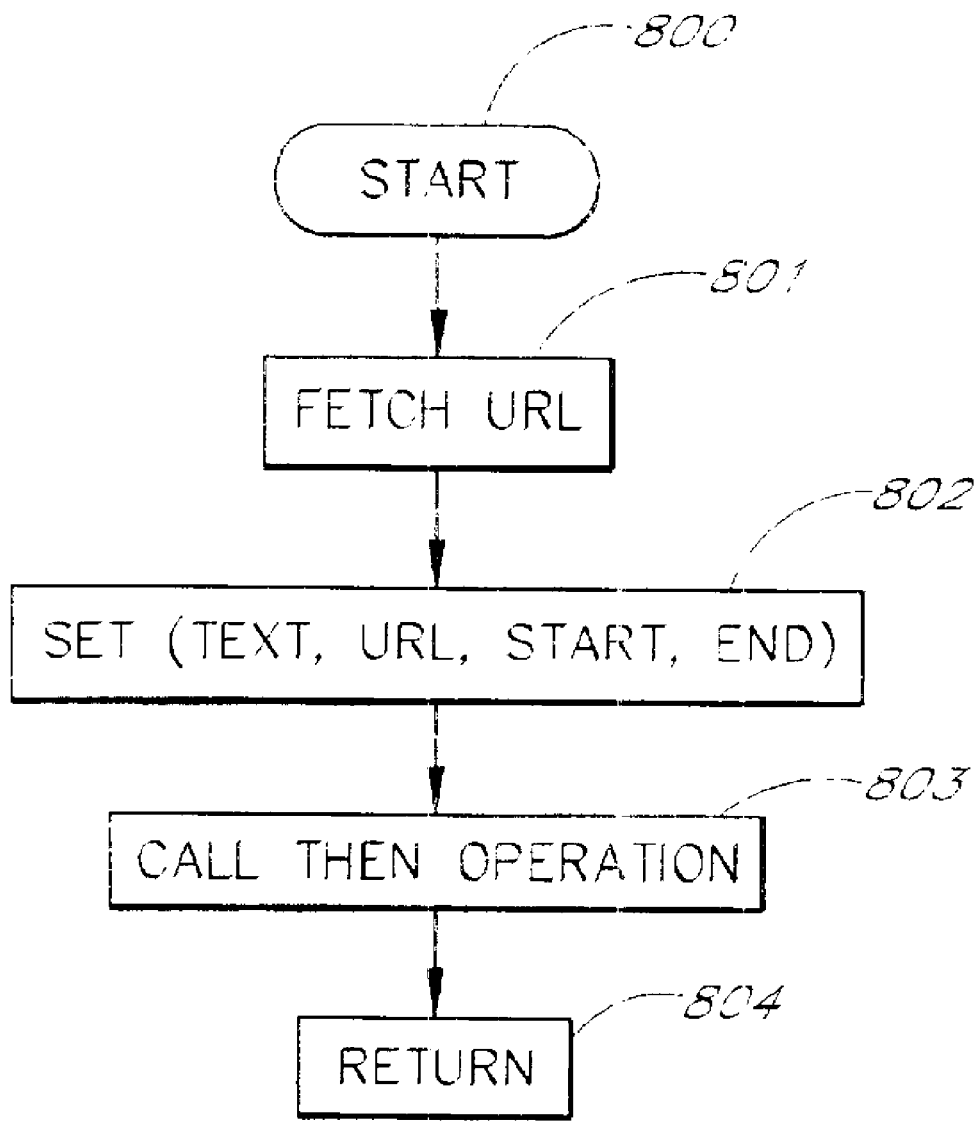
FIGS. 8A–G illustrate flowcharts of the functionality of some basic wrapper operations.

The Start operation functions to start the execution of the wrapper and is the first operation to be performed when running a wrapper. As illustrated in the flowchart 800 of FIG. 8A, the Start operation fetches the Web page specified in the URL property at step 801. At step 802 the Start operation stores the text of the page in TEXT and sets the other variables, URL, START, and END accordingly. At step 803, the start operation calls the THEN operation and awaits its completion. The THEN operation is the operation to which the directed link from the Start operation points on the wrapper graph canvas 704. Once the THEN operation completes, the execution of the wrapper is also complete and the Start operation returns at step 804.

As the Start operation will typically not be called or linked to by another operation, the start operation need not have input variables. The only property that needs to be set by the user is the URL at which to start the wrapper. Upon creating a new wrapper, the Start operation is automatically placed on the canvas. The user need only edit the Start operation's properties and continue creating the remainder of the wrapper.

b. Match Operation

| | |
|---|---|
| Input variables: | TEXT, URL, START, and END. |
| Output Variables: | TEXT - same as the input variable. |
| | URL - same as the input variable. |
| | START - the start position of a matched variable within the TEXT. |
| | END - the end position of the matched variable within the TEXT. |
| Properties: | MATCH - the match expression specifying how to iteratively match the input TEXT of interest. The matching is only performed on the portion of the TEXT delimited by the START and END input variables, not the whole TEXT. |
| | EMIT - a boolean property indicating whether the present variable values should be output as a new row in the output table. |
| | HOW MANY - the number of matches to process, can be any number or "ALL" to indicate that the complete TEXT should be processed for matches, regardless of how many are found. |
| Destination Operations: | One destination can be associated with each matched variable. |

Figure 8B:
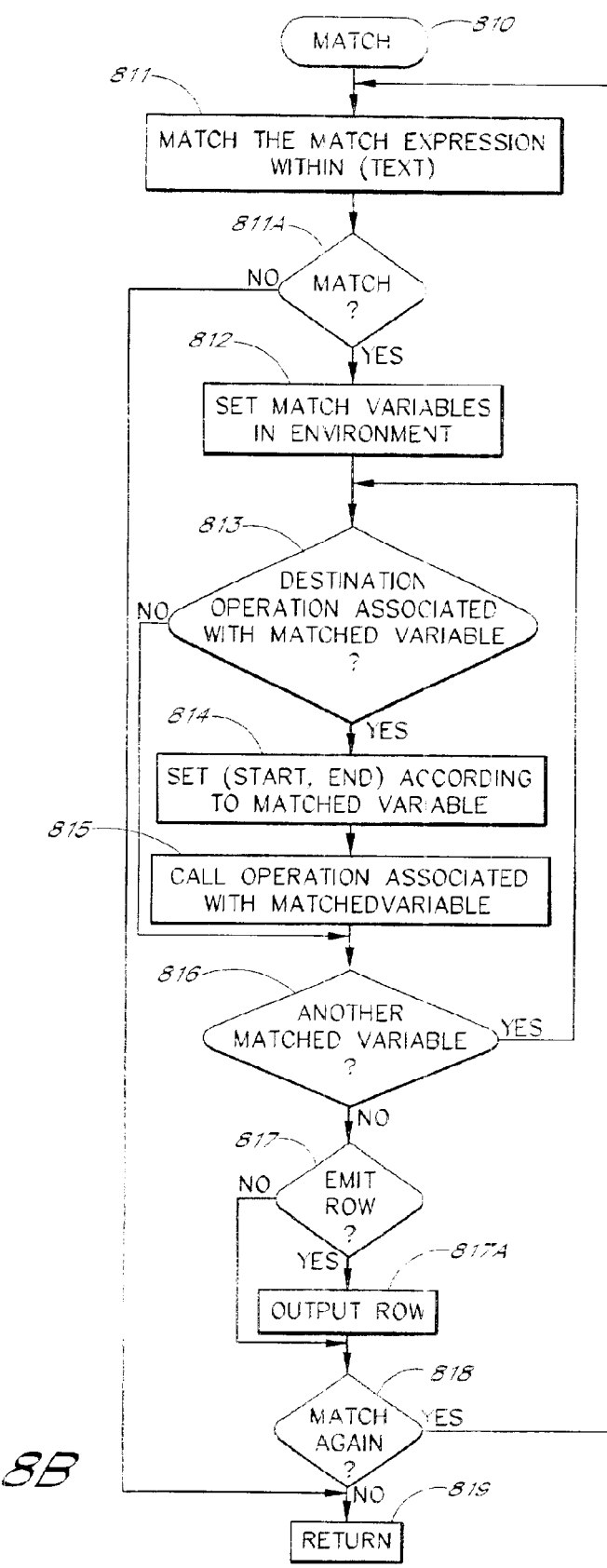

The Match operation is used to match structure in a Web page using regular expressions, as illustrated by the flowchart 810 of FIG. 8B. The Match operation can be configured to bind portions of a matched expression to variables in the execution environment upon matching a regular expression. In addition, the Match operation can be configured to call destination operations to further process bound variables. Finally, the Match operation can be configured to output a row of data based upon the variable bindings in the current execution environment.

At step 811 of flowchart 810, the Match operation attempts to match a match expression, as specified by the MATCH property variable, to the input variable TEXT between the START and END positions. Acceptable regular expressions can contain variables to which the Match operation will bind portions of the matched text. For example, the match expression, "'<b>'BTEXT '</b>'" consists of the literal or constant "<b>" followed by the variable "BTEXT," followed by another literal "</b>." The expression will match a sequence of characters consisting of a "<b>" followed by any sequence of characters ending in a "</b>."

At step 811A, if the MATCH expression is not found in the input TEXT, then the Match operation immediately returns at step 819. However, if at step 811A a match is found, control passes to step 812. At step 812, each matched variable takes on the value of the associated matched sequence of characters. In the previous example, the sequence of characters following the "<b>" and preceding the "</b>" would be bound to or stored in the variable "BTEXT," at step 812. Within HTML, a sequence, "<b>" "</b>" denotes bold text; anything between the two delimiters will be displayed in bold format. Thus, the previous expression will match a continuous sequence of bold text within the operation's input TEXT variable and store the characters of the matched bold text in the variable BTEXT. In this manner, the Match operation allows a user to identify structure within a Web page that delimits information of interest or may lead to information of interest.

The regular expressions from which the match expression can be composed can include variables, literals, and match instructions. Variables, such as BTEXT, as used above, can be used without being first defined or created. Literals are sequences of characters enclosed in quotes. To include a quote character in a literal, it is preceded by a backslash. Match instructions allow further flexibility in defining match expressions. Match instructions can include, but need not be limited to the following:

to('x')—reads TEXT up to 'x';

backto('x')—reads TEXT backwards up to 'x';

pos(N)—read to position N in TEXT;

pos(+N)—read forwards N characters in TEXT;

pos(-N)—read backwards N characters in TEXT;

to('x' 'y' 'z')—read TEXT up to 'x' if match exists, otherwise read TEXT up to 'y' if match exists, otherwise read TEXT up to 'z' if match exists;

set(var exp)—set variable "var" to result of evaluating expression "exp";

'x' var1 'y' var2 'z'—read up to 'x', save up to 'y' into var1, save up to 'z' into var2; and 'x' var lookahead('y')—read up to 'x', save up to and including 'y' into var.

Each match expression typically contains at least one variable that can be linked to a destination operation. At step 813, the Match operation determines whether a destination operation is associated with the current matched variable. If so, at step 814, the START and END variables are set to identify the matched variable within TEXT and the destination operation is called at step 815. In this manner, the matched variable is effectively passed on to the destination operation. Upon completion of the destination operation associated with a particular matched variable, the Match operation passes control to step 816. If, at step 813, no destination operation is associated with the current matched variable, control passes directly to step 816.

At step 816, the Match operation checks whether there is another matched variable in the current match expression. For additional matched variables, the Match operation repeats steps 813–816 as necessary.

At step 817, the Match operation checks the value of the EMIT property. If EMIT is set to true, then the wrapper outputs a row of data at step 817A. The Match operation outputs a row of data by applying the associations specified in the category file to the variable bindings in the current execution environment. As discussed above, the category file defines associations between wrapper variables and columns in an output table. Using the category file, the Match operation produces SQL commands that populate a row of a relational database table in which the data of interest is output.

At step 818, the Match operation determines whether it will attempt to match the match expression again. The HOW MANY property specifies how many times a Match operation will attempt to match a match expression. The HOW MANY property can take on integer values or the value "ALL" to indicate that the Match operation should attempt to perform matches until the end of the input TEXT is reached. If the Match operation has not completed the number of matches specified by the HOW MANY property, control will pass back to step 811. If HOW MANY matches have already been performed, control passes to step 819 and the Match operation returns control to the source operation that called it.

| c. Follow Links Operation | |
|---|---|
| Input variables: | TEXT, URL, START, and END. |
| Output Variables: | TEXT - set to the complete text of the followed URL. |
| | URL - the origin of the TEXT. |
| | START - set to 0. |
| | END - set to the length of TEXT minus 1. |
| Properties: | SAVETITLE - the name of the variable into which the hypertext tag associated with a link will be saved. |
| Destination Operations: | THEN - the destination operation to be called upon following a Web link. |

Figure 8C:
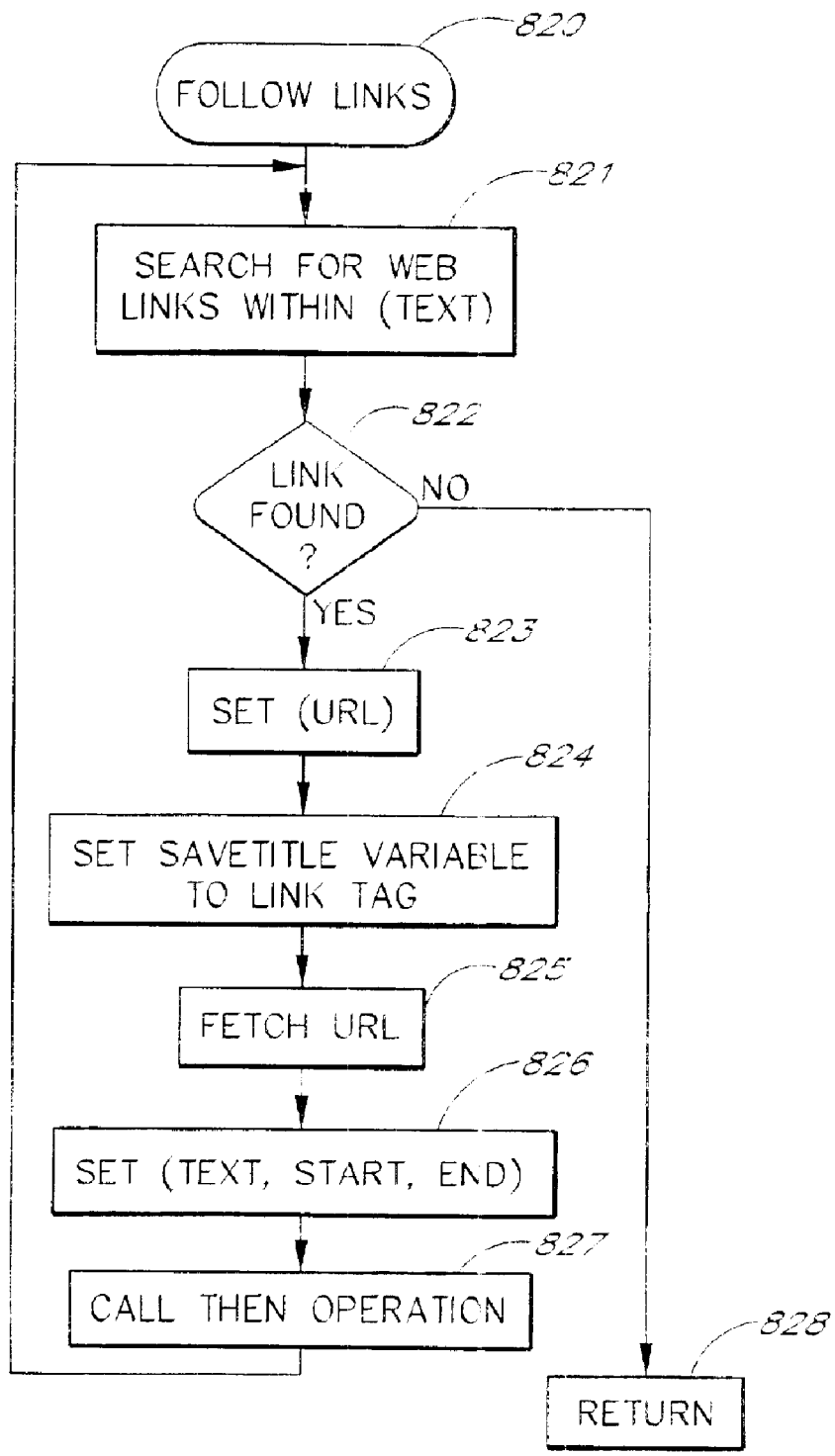

As illustrated by flowchart 820 in FIG. 8C, the Follow Links operation follows each Web link in the input TEXT between START and END. At step 821, the Follow Links operation searches for Web links within the input TEXT beginning at the START position. If, at step 822, no link has been found in the input text, the Follow Links operation returns control to the calling operation at step 828. If a link is found, however, the URL of the hypertext link is stored in the URL wrapper variable at step 823.

The SAVETITLE property causes the HTML tag associated with a followed link to be stored in the variable named in the SAVETITLE property at step 824. At step 825, the Follow Links operation fetches the page associated with the URL and at step 826 the variables TEXT, START, and END are set according to the listings above. At step 827, the Follow Links operation calls the THEN operation and awaits its completion. Upon completion of the THEN operation, control is passed back to step 821, to search for additional Web links.

The Follow Links operation can be used in conjunction with a Match operation to identify a link of interest and then follow it. The Match operation can serve to identify the link and then the Follow Links operation will follow the link that was matched by the Match operation. Alternatively, the Follow Links operation could be applied to the complete text of a Web page, and then the Match operation could be used to determine whether links of interest have been followed by matching expressions in the resulting Web pages.

| d. Set Fields Operation | |
|---|---|
| Input variables: | TEXT, URL, START, and END. |
| Output Variables: | TEXT - same as the input variable. |
| | URL - same as the input variable. |
| | START - same as the input variable. |
| | END - same as the input variable. |
| Properties: | VARIABLES - variables to be set in the execution environment and the associated values. |
| Destination Operation: | THEN - the destination operation to be called upon completing the variable assignment(s). |

Figure 8D:
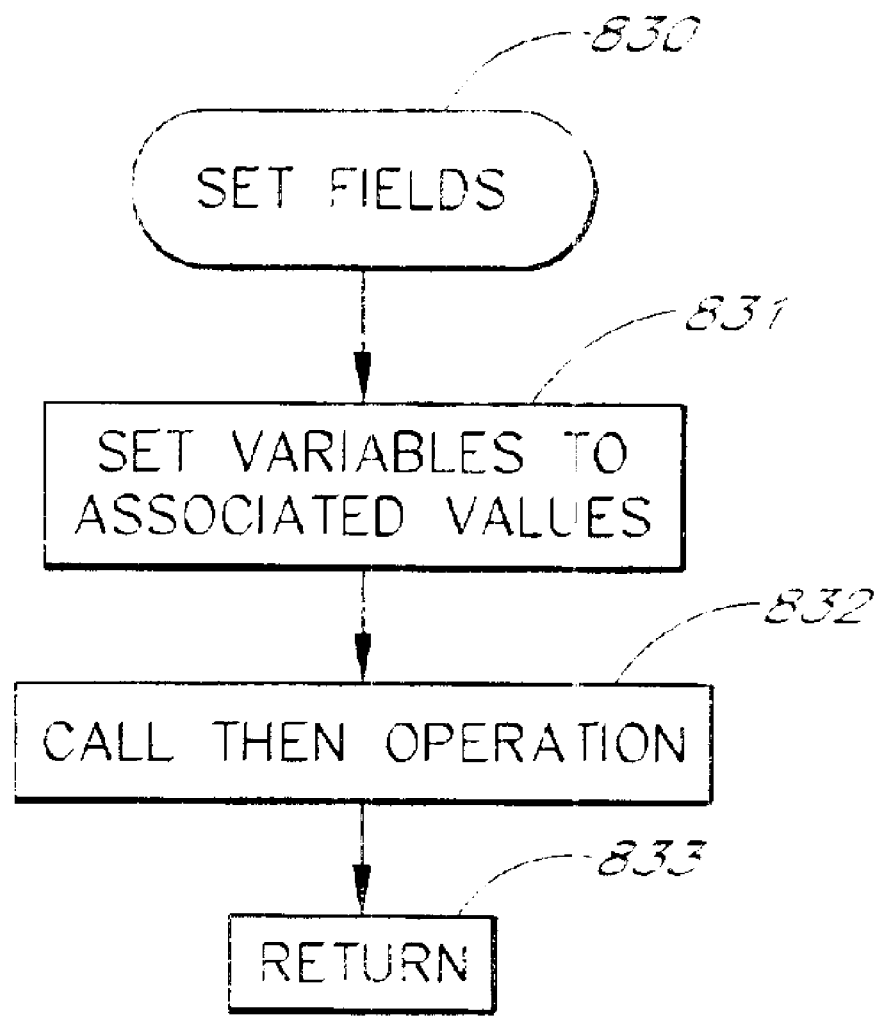
Figure 8E:
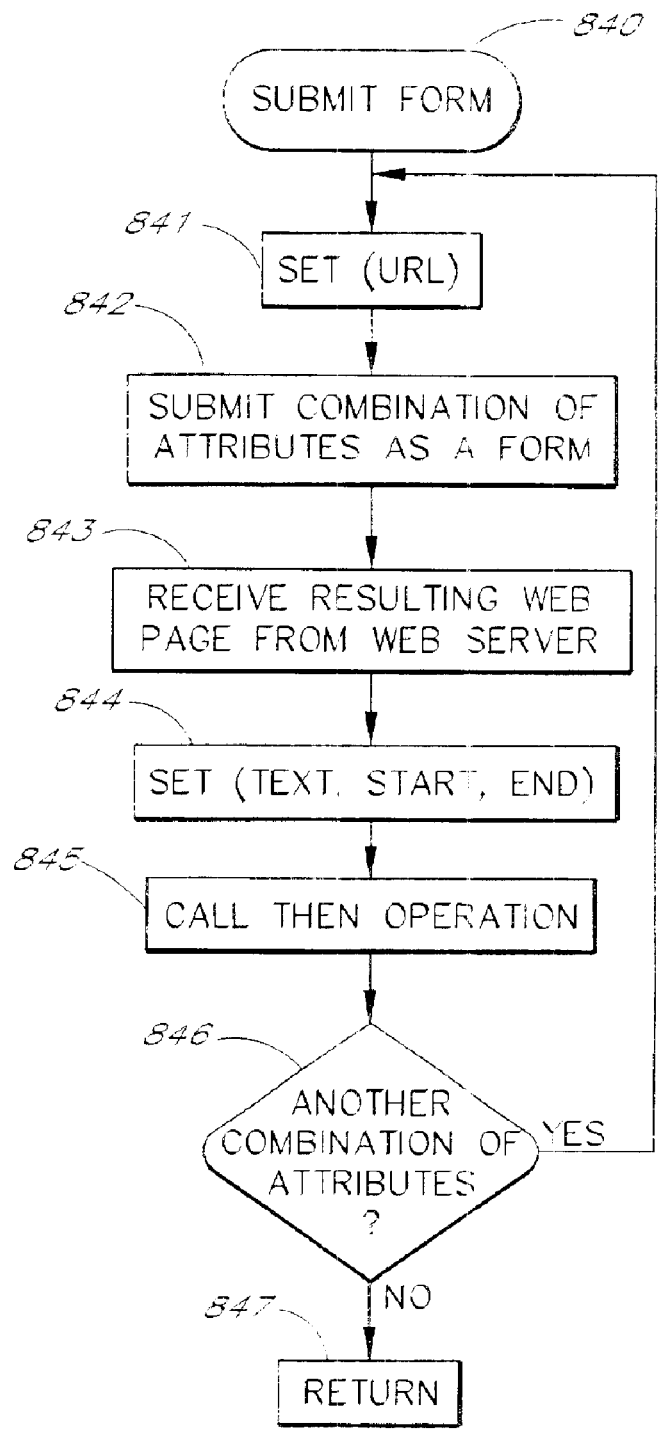

The Set Fields operation assigns values to wrapper variables in the execution environment, as illustrated by flowchart 830 in FIG. 8D. The properties of the Set Fields operation comprise the names of variables to be bound in the execution environment. Each variable name has an associated value to which it will be bound by the Set Fields operation. At step 831, the variables are created, if necessary, and bound to their associated values. At step 832, the THEN operation is called, and upon its return, the Set Fields operation also returns at step 833.

| e. Submit Form Operation | |
|---|---|
| Input variables: | TEXT, URL, START, and END. |
| Output Variables: | TEXT - set to the complete text of the followed URL. |
| | URL - the origin of the TEXT. |
| | START - set to 0. |
| | END - set to the length of TEXT minus 1. |
| Properties: | ITERATE_OVER_ATTRIBUTES - a list of attribute-value pairs that are submitted in response to an HTML form. The value elements can be lists of values. |
| | ITERATE_IN_SYNC - the attributes for which iteration over the value lists will occur synchronously. |

-continued

| e. Submit Form Operation | |
|---|---|
| Destination Operation: | THEN - the destination operation to be called upon following the URL resulting from the form submittal. |

The Submit Form operation allows a wrapper to submit HTML forms to a Web server as illustrated in flowchart 840 of FIG. 8B. At step 841, the Submit Form operation sets the URL variable to the action URL of the form. The action URL is the URL associated with the form that allows the server to process the form. At step 842, the Submit Form operation submits a form to a Web server using one combination of attributes for the form values. The Web server will respond with a new Web page at step 843. At step 844, the SUBMIT FORM sets the TEXT, START, and END variables as described above. At step 845, the Submit Form operation calls the THEN operation, which operates on the new Web page, and awaits its return. At step 846, the Submit Form operation determines whether there is another combination of attribute values that can be submitted in response to the form. If so, then control is passed back to step 841 and the subsequent steps repeat. If all of the possible combinations of attribute values have been exhausted, then the Submit Form returns control to the calling operation at step 847.

The ITERATE_OVER_ATTRIBUTES property identifies the attributes of the form and the associated values for each attribute that the user would like to submit in response to the form. Each attribute can be associated with a single value or a list of values. Upon execution, the Submit Form operation will submit a form, receive the resulting web page, and call the destination operation for each possible combination of attribute values. The number of different possible combinations of attribute values is the product of the numbers of values associated with the attributes. The following example should help to clarify the concept of attributes and values:

| ATTRIBUTE | VALUES |
|---|---|
| color | red, blue, green |
| size | 4, 6, 8 |

In this example, there are nine possible combinations of color and size. Supposing a form had spaces for both color and size, the Submit Form operation would submit the nine different combinations and the server would respond with the nine resulting Web pages.

In some instances, the user may only be interested in certain combinations of values of attributes. In this case, the user can indicate that certain attributes iterate over their possible values synchronously. The ITERATE_IN_SYNC property is used to indicate those attributes over which the Submit Form should synchronously iterate through the values. All attributes identified in the ITERATE_IN_SYNC property should have the same number of associated values. Thus, in the above example, if color and size were listed as ITERATE_IN_SYNC attributes, there would only be three possible combinations, namely, (red, 4), (blue, 6), and (green, 8).

| f. If Operation | |
|---|---|
| Input variables: | TEXT, URL, START, and END. |
| Output Variables: | TEXT, URL, START, END - all the same as the input variables. |
| Properties: | TEST - expression to evaluate. If the expression evaluates to true, call true operation. If the expression evaluates to false, call false operation. |
| Destination Operations: | TRUE and FALSE operations. |

Figure 8F:
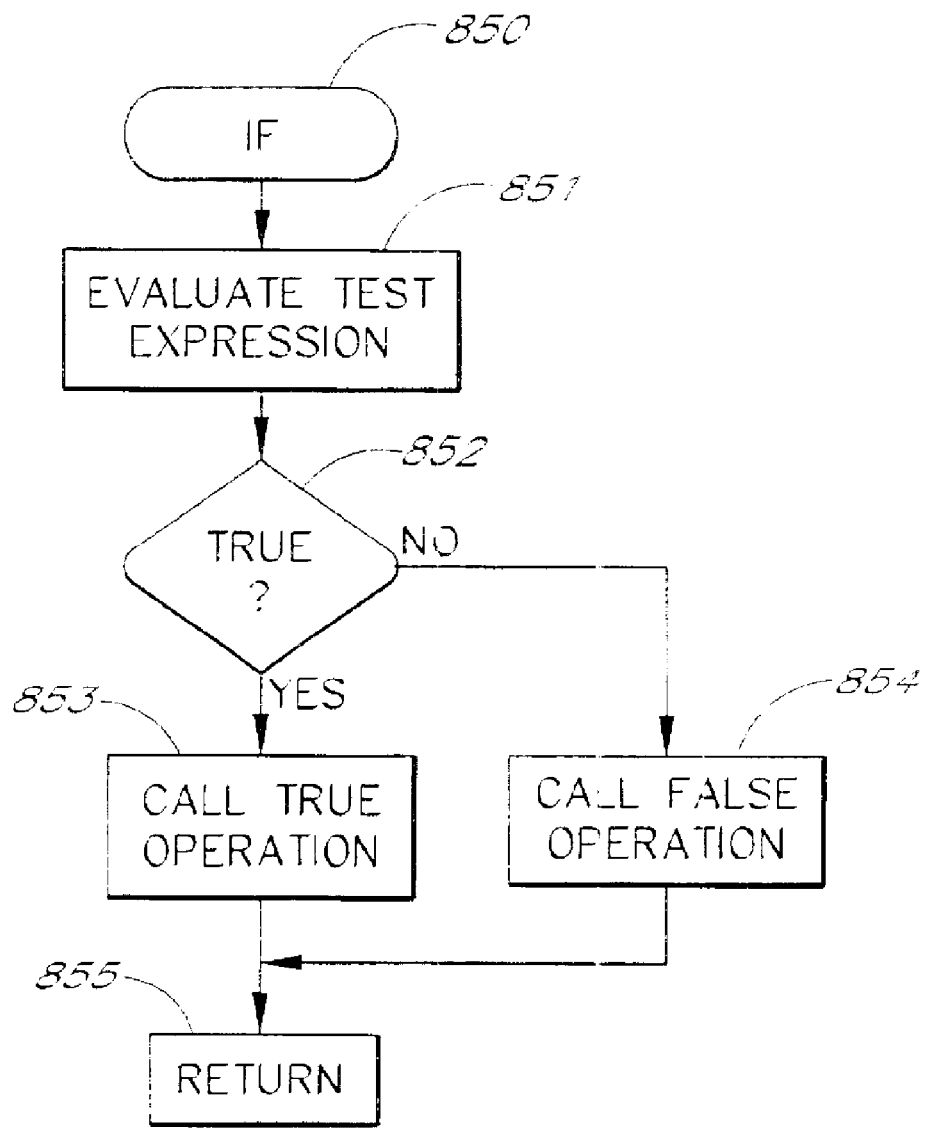

As illustrated by flowchart 850 in FIG. 8F, the If operation calls one of two destination operations based upon the evaluation of an expression. The If operation takes a TEST expression as its property and is linked to TRUE and/or FALSE destination operations. At step 851, the If operation evaluates the TEST expression. Valid TEST expressions are determined by the implementation of the If operation. In the preferred embodiment, for example, the TEST expression could be set to "contains('<TR>')". This expression will evaluate to TRUE if the TEXT variable contains '<TR>' between START and END. Otherwise, the expression will evaluate to FALSE. At step 852, control is passed to step 853 if the TEXT expression evaluates to TRUE. At step 853, the If operation calls the TRUE destination operation and awaits its return. Upon the return of the TRUE operation, the If operation returns at step 855. At step 852, control is passed to step 854 if the TEST expression evaluates to FALSE. At step 854, the FALSE destination operation is called and the If operation awaits its return. Upon the return of the FALSE operation, the If operation returns at step 855.

| g. Extract Operation | |
|---|---|
| Input variables: | TEXT, URL, START, and END. |
| Output Variables: | TEXT - same as the input variable. URL - same as the input variable. START - same as the input variable. END - same as the input variable. |
| Properties: | VARIABLES - variables to be set in the execution environment using Java extraction functions. |
| Destination Operation: | THEN - the destination operation to be called upon completing the variable assignment(s). |

Oftentimes, variables of interest are represented in a common format, regardless of the structure of the Web site on which they are found. For example, a price will usually be represented in the format of a dollar sign followed by a series of numbers. Dates will usually be represented in one of a number of possible formats. Information that is universally represented in one or a number of common formats can be efficiently handled by Java functions. These functions can be written once and used for all wrappers.

Figure 8G:
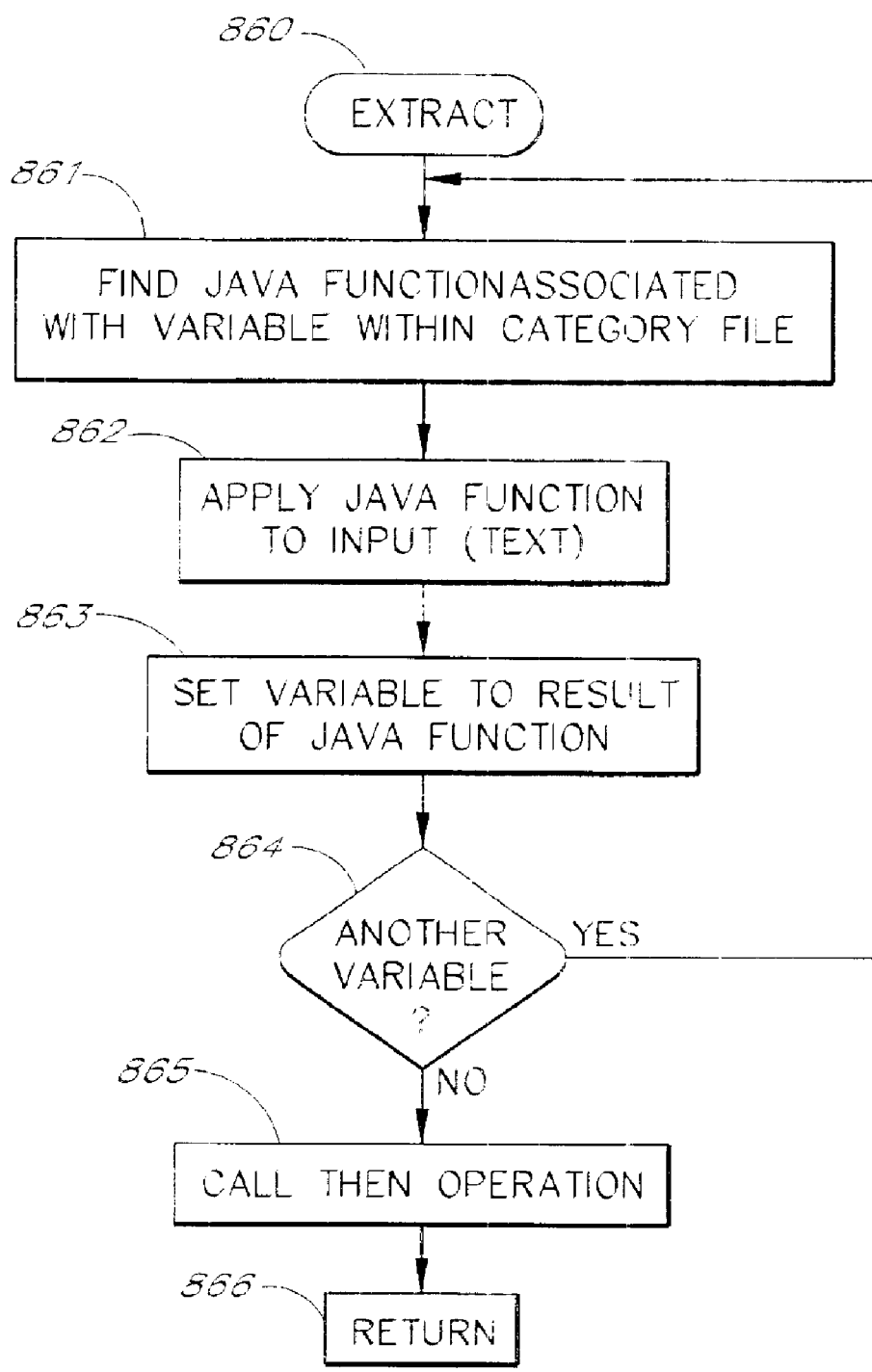

The Extract operation provides a method of extracting variable values from the input TEXT using predefined Java functions as illustrated by flowchart 860 in FIG. 8G. At step 861 the Extract operation looks up in the category file the Java function associated with a variable listed in VARIABLES property. At step 862, the Java function is applied to the input TEXT variable between START and END. The output of the Java function will be the value to which the variable of interest is bound in the execution environment at step 863. At step 864, the Extract operation checks to see whether there is another variable to be extracted within the VARIABLES property. If so, then control returns to step 861 for the processing of the next variable. Once all of the variables have been processed, step 864 passes control to step 865 at which the THEN destination operation is called. The Extract operation awaits the return of the THEN operation upon which the Extract operation also returns at step 866.

Line 18 of the category file illustrated in FIG. 6, for example, shows the association of the variable PRICE with the Java function "amazon.util.ExtractPrice." An Extract operation listing PRICE as one of the variables in the VARIABLES property would pass to the "amazon.util.ExtractPrice" function the input TEXT variable between START and END. The function, which can be easily written in Java to recognize dollar amounts within text, will return a price. The returned value is then bound in the execution environment to the wrapper variable PRICE. In this manner, simple or complicated matching functionality that is frequently reused can be written once in Java, by an experienced programmer, as opposed to recreating the functionality in each wrapper using wrapper operations each time the functionality is needed.

h. Other Operations

Although the basic operations that can be used to create wrappers are described herein, the wrapper builder application can be extended to provide additional operations. As new formats for Web pages appear and as new standards for HTML and Java are implemented, the operations required to satisfactorily extract data from Web pages can increase in number. The wrapper builder application can also be extended by providing additional features and functionality to operations that have already been described.

E. Run and Debug Environment

The wrapper builder incorporates a graphical run and debug environment in which the wrapper can be examined as it is run. The run and debug environment operates in conjunction with the wrapper editor 702, so that the wrapper can be edited and debugged/run simultaneously. The individual operations 1001–1006 are highlighted as they are executed within the wrapper graph canvas 704.

A wrapper can be configured to run within the run/debug environment with specified delays between the operations or by using a number of debugging buttons incorporated into a toolbar 740 at the top of the wrapper editor 702. The buttons provide for stopping or starting the wrapper execution, for adding or removing breakpoints, for continuing or stepping operation, and for adding and removing cutpoints as discussed above in the subsection titled "Wrapper Editor."

As illustrated in FIGS. 9A–D, the wrapper builder provides a debug frame 900, that displays information related to the running of the wrapper. Four tabs at the top of the debug frame 900 allow the user to switch the data displayed by the frame. The tabs include: Site Overview, HTML Source, Variable Bindings, and Listing View.

Figure 9A:
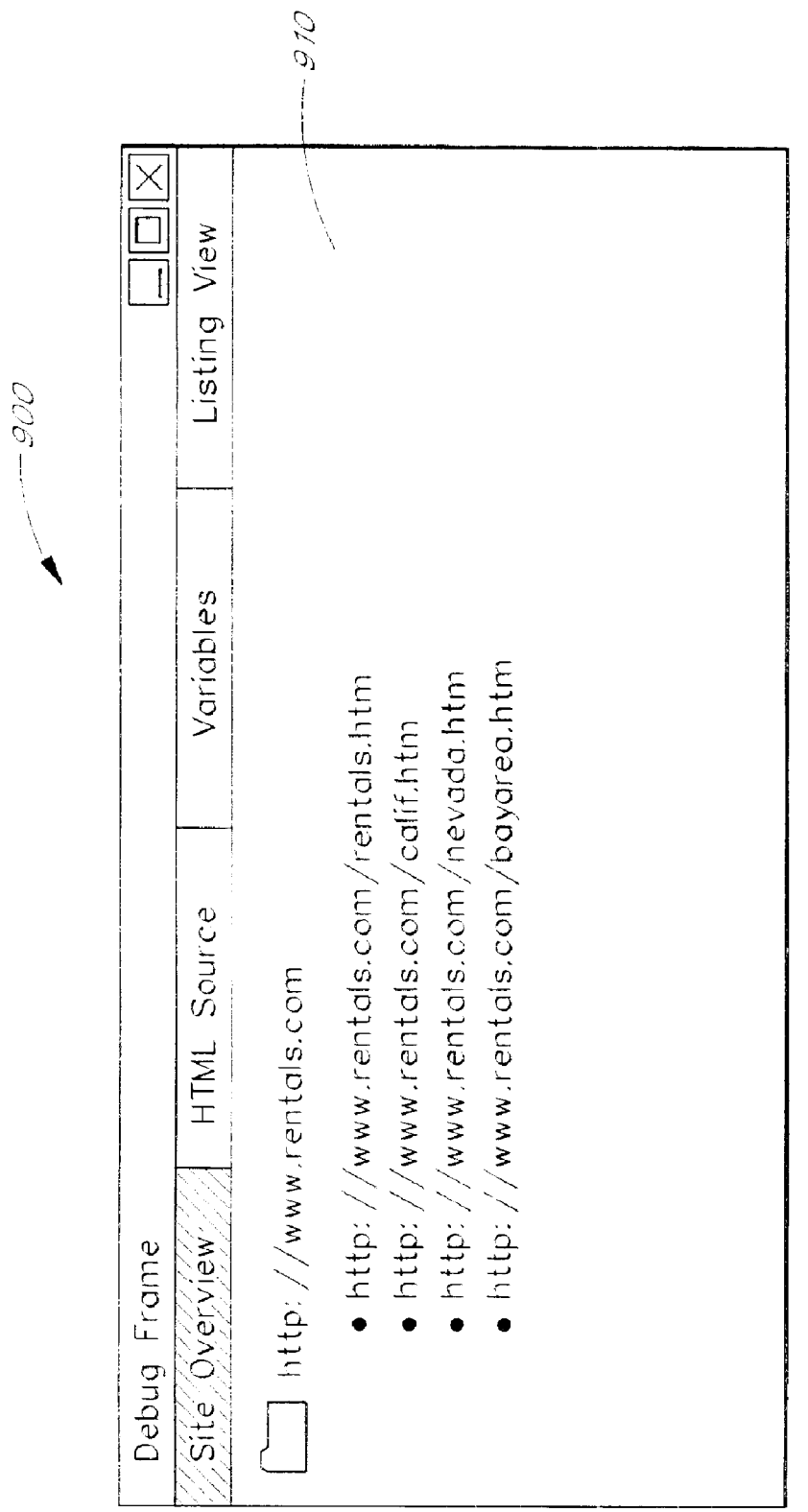

FIG. 9A illustrates the debug frame 900 when the Site Overview tab is selected. The site overview tab causes the debug frame 900 to display a tree listing 910 of the URLs that have been accessed by the wrapper. The tree listing 910 can be of use to the user in editing the wrapper. FIG. 9B illustrates the debug frame 900 when the HTML source tab is selected. The HTML Source tab causes the debug frame 900 to display the HTML source 920 of the current page, with any matched portions being highlighted.

FIG. 9C illustrates the debug frame 900 when the Variables tab is selected. The Variables tab causes the debug frame 900 to display the variables and bindings in the current execution environment 930. The execution environment 930 was discussed above in the subsection titled "Wrapper Operations."

FIG. 9D illustrates the debug frame 900 when the Listing View tab is selected. The Listing View tab causes the debug frame 900 to display the current listings 940 (table column entries). The listings 940 are defined by the category file's association of environment variable bindings to table columns in the tabular output. Each row in the listings 940 consists of a table column. The first entry, for example "PROPERTIES.STATE," refers to the STATE column of the PROPERTIES table, as defined in the category file 600 illustrated in FIG. 6. Following the identification of the table column, in parentheses, is the environment variable to which the table column is bound, for example, the "(STATE)" environment variable. Next is the value associated with each listing, for example, the value "California."

In addition to displaying the current listings 940, the run/debug environment also provides a table display window 500 as illustrated in FIG. 5. The table display window 500 displays the accumulated rows of data produced by the SQL output of the wrapper upon execution.

With the various tools provided by the wrapper builder, the proper operation of the wrapper can be verified. Thus, the wrapper can be run, edited, and verified all in the same environment.

The present invention also contemplates the use of a statistical analysis tool for verifying the operation of the wrapper on more extensive and complex Web sites. The statistical analysis tool can be a standard package that the user can run on a wrapper's SQL output to check for null values or missing data. Proper wrapper operation can be verified through the number of null values or missing entries in wrapper output.

III. Example Wrapper

Figure 10:
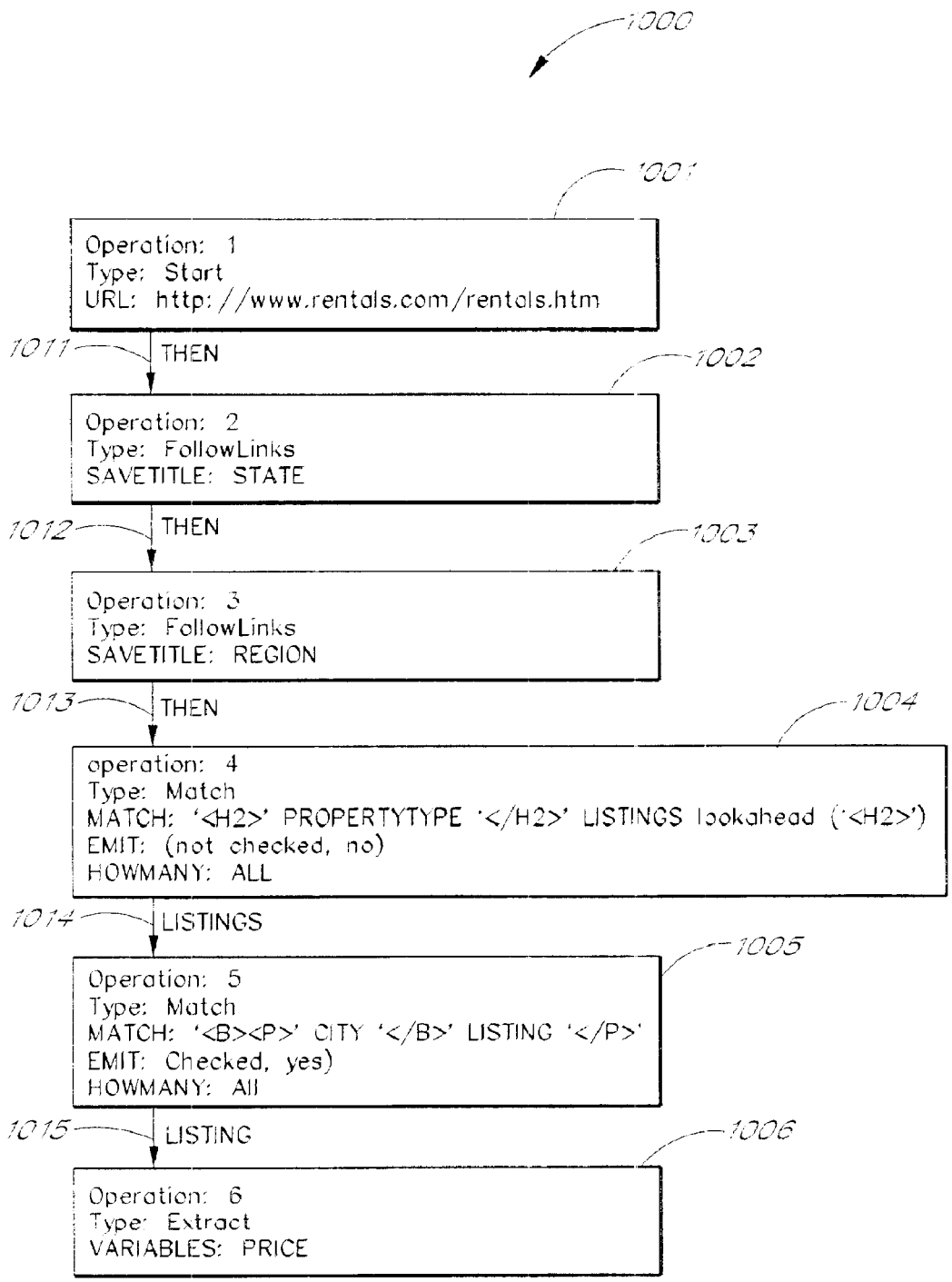
FIG. 10 illustrates a schematic diagram of an example wrapper.

In this section an example wrapper is presented and its application to a sample web site is demonstrated. FIG. 10 illustrates a schematic diagram 1000 of the example wrapper. The associated category file is illustrated in FIG. 6. In FIG. 7, an illustration 1001 of the same wrapper is shown as it would be displayed on the wrapper graph canvas 704. The example wrapper was designed to extract information from the hypothetical web site illustrated in FIGS. 3A–C, the corresponding HTML being shown in FIGS. 4A–C. Each operation in the schematic 1000 consists of a box containing the name of the operation (following the word "Operation"), the type of the operation (following the word "Type"), and the properties and associated values of the operation. The names adjacent to the links between operations indicate the name a source operation uses to refer to a destination operation.

Operation 1001 of the wrapper is the Start operation and is named "1." The URL property of operation 1001 is bound to the hypothetical URL "http://www.rentals.com/rentals.htm." Upon execution, the start operation will fetch the HTML text of the URL; the text is shown in FIG. 4A. It should be noted that although Web pages typically contain references to images, the actual HTML code consists solely of text. Upon fetching this text, the operation 1001 binds the URL variable to the URL, the TEXT variable to the complete text of the URL, the START variable to the value 0, and the END variable to the value 132, which is the number of characters in the page minus 1. At this point the THEN operation 1002 is called as indicated by the directed link 1011.

Operation 1002 of the wrapper is a FollowLinks operation and is named "2." The SAVETITLE property of the operation is set to STATE. Thus, upon finding a hypertext link, the operation 1002 saves the HTML tag associated with the hypertext link in the variable STATE. In this case the first link encountered is "<A HREF="calif.htm">California</A>" and the associated tag is "California." Therefore, the operation 1002 binds the variable STATE to "California." Next, the FollowLinks operation follows the first link to the URL "http://www.rentals.com/calif.htm" and fetches the associated Web page illustrated in FIG. 4B. The TEXT, URL, START, and END variables are updated to identify the complete text of the fetched page. At this point the THEN operation 1003 is called as indicated by the directed link 1012.

Operation 1003 functions in a similar manner to operation 1002 as it is also a FollowLinks operation. It follows the first link, "http://www.rentals.com/bayarea.htm," within the text depicted in FIG. 4B, and fetches the page depicted in FIG. 4C. The variables TEXT, URL, START, and END are set according to the new page, and the REGION variable is bound to "Bay Area." At this point the THEN operation 1004 is called as indicated by the directed link 1013.

Operation 1004 is a Match operation that operates upon the complete text depicted in FIG. 4C. The operation 1004 attempts a first match and is successful. The PROPERTYTYPE variable is bound to "Condos" and the LISTINGS variable is bound to the following:

<B><P>Palo Alto</B>2 BR/1 BA with sunny dining area and new carpeting. $1200/mo. <P><B><P>Los Altos</B>Terrific views from this end unit. Only $1500/mo if you respond to this ad before 9/15. </P>

Note that the lookahead instruction indicates that the Match operation 1004 should begin its next match attempt at the beginning of the character sequence '<H2>', following the LISTINGS text, rather than after it. The lookahead instruction ensures that indicating sequence '<H2>' is made available to the next match. Returning to the execution of operation 1004, as no link is associated with the PROPERTYTYPE variable, there is no link to follow. The LISTINGS variable, however, is associated with a link 1014 to operation 1005. Operation 1004 thus sets the START, and END variables to define the match of the LISTINGS variable within the TEXT. START is set to 64 and END is set to 262. At this point, operation 1005 is called.

Operation 1005 is another Match operation, but this Match operation 1005 only operates upon a limited portion of the TEXT variable defined by START and END, which were set by operation 1004. Within the TEXT, the Match operation 1005 matches and binds CITY to "Palo Alto" and LISTING to the following text:

2 BR/1 BA with sunny dining area and new carpeting. $1200/mo.

Since there is no link associated with the CITY variable, the operation 1005 sets the START and END variables to reflect the matched text of LISTING within TEXT and calls the operation 1006 associated with the LISTING variable by a link 1015.

Operation 1006 is an Extract operation. The operation 1006 looks to the category file to find the Java function associated with the variable PRICE. The operation 1006 then runs the function "amazon.util.ExtractPrice" on the TEXT between the START and END characters. The result of the function is the value 1200, which is bound to the variable PRICE.

At this point the Extract operation 1006 returns and passes control back to the Match operation 1005. The Match operation 1005 checks its EMIT property and finds it set to true, therefore the Match operation 1005 emits a row of data. The row of data is produced by applying the category file's associations to the current environment. The execution environment at this point is illustrated in FIG. 10A. The category file, as illustrated in FIG. 6, binds the STATE, REGION, CITY, PROPERTYTYPE, and PRICE columns of the PROPERTIES table to the STATE, REGION, CITY, PROPERTYTYPE, and PRICE variables in the execution environment. Based upon the variable bindings illustrated in FIG. 10A, the wrapper produces a sequence of SQL commands that generate the first row in the output table 500 of FIG. 5.

Once the Match operation 1005 has produced a row of output, it checks the HOWMANY variable, which is set to ALL. The Match operation 1005 then attempts further matches. The functioning of the wrapper continues in this manner with control going back to operation 1006, returning to operation 1005, upon which another row of data is output. Control then passes back to operation 1004, which processes another match. The sequence of control then passes back down through operations 1005 and 1006 as necessary. The wrapper continues execution in this manner until each operation has completed execution and the Web site is fully processed.

IV. Wrapper Builder Implementation

Figure 11:
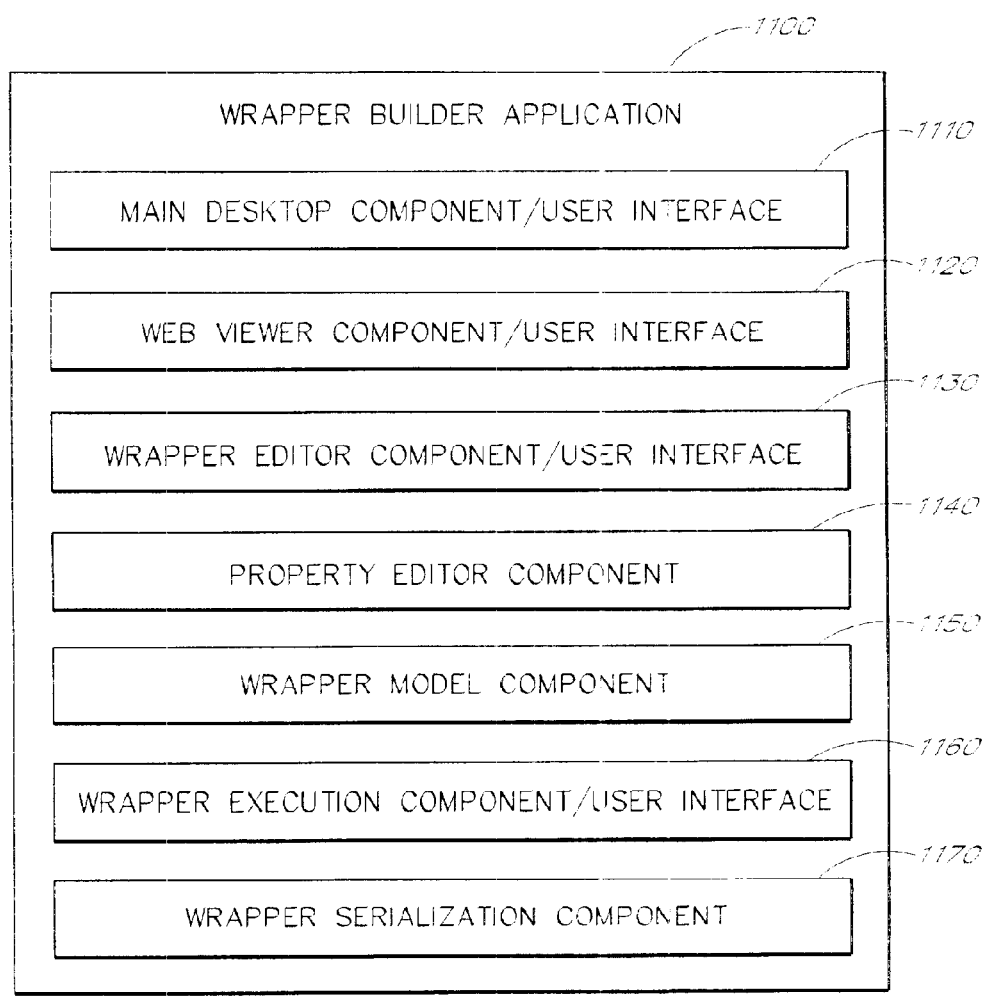
FIG. 11 illustrates a number of components which the wrapper builder application comprises.

In the preferred embodiment, the wrapper builder application 1100 is implemented as a Java application comprising several components as illustrated in FIG. 11. The main desktop component 1110 implements the main desktop 700 user interface and its functionality. The web viewer component 1120 implements the web viewer 200 user interface and its functionality. The wrapper model component 1150 implements a number of methods and data structures from which a wrapper is formed in the wrapper builder application. The wrapper editor component 1130 implements the various aspects of the wrapper editor 702 user interface. The wrapper editor component 1130 also operates in conjunction with the wrapper model component 1150 to implement the functionality of the wrapper editor 702 as viewed by the user. The property editor component 1140 provides the pop up property editor dialog box 708 and its associated functionality. The wrapper execution component 1160 implements the various aspects of the run and debug environment provided by the wrapper builder. The debug frame 900 user interface and the run/debug toolbar 740 user interface and their functionality are implemented by the wrapper execution component 1160. The wrapper serialization component 1170 implements the functionality by which wrappers are stored and retrieved, called serialization. A number of these components will be discussed in greater detail in the subsections below.

The components mentioned above employ user interfaces and accompanying functionality that are well known in the art. The web viewer 200, for example, can be implemented using an encapsulation of the HotJava bean component, which is well known in the art. The wrapper editor 702 can be implemented with techniques similar to those used in the numerous drawing programs available on the market. The table display window 500, text editor, tree view frame 208, HTML source frame 212, main desktop 700, menus, capture of the user input, and other aspects of the graphical user interface can be implemented in a straightforward manner using well known programming techniques. The implementation of aspects such as these is a matter of course in the writing of any extensive Java application.

A. The Wrapper Model Component

The wrapper model component 1150 enables the creation and representation of wrappers within the wrapper builder application. The wrapper model component 1150 comprises a number of Java classes, objects, and methods that implement the wrapper.

1. Class Hierarchy

Figure 12:
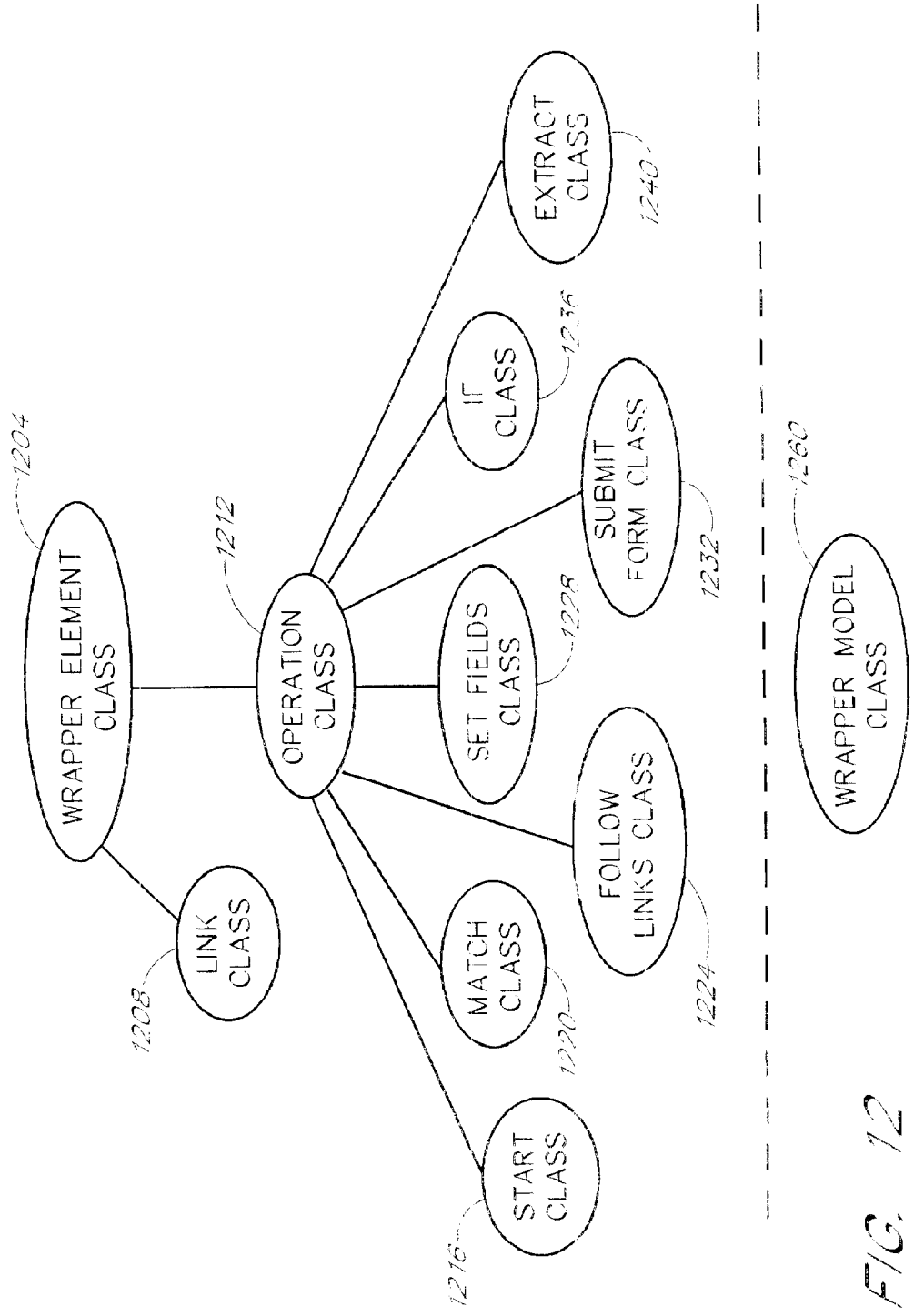
FIG. 12 illustrates the class hierarchy of the classes from which a wrapper is constructed.

The wrapper model component 1150 defines a number of classes, within the wrapper builder's Java code, from which a wrapper is constructed. The classes are organized in a hierarchy as illustrated in FIG. 12. At the highest level of the hierarchy is the WrapperElement class 1204. The Wrapper-Element class 1204 serves as the superclass for its two subclasses, the Link class 1208 and the Operation class 1212. The Operation class 1212 also has a number of subclasses comprising the various operation types from which a wrapper is constructed. These subclasses comprise a Start class 1216, a Match class 1220, a FollowLinks class 1224, a SetFields class 1228, a SubmitForm class 1232, an If class 1236, and an Extract class 1240.

Also illustrated in FIG. 12 is the WrapperModel class 1260. An instance of the WrapperModel class 1260 serves as a handle to the wrapper itself and contains references to all of the wrapper's operations and links.

2. Object Organization

Figure 13:
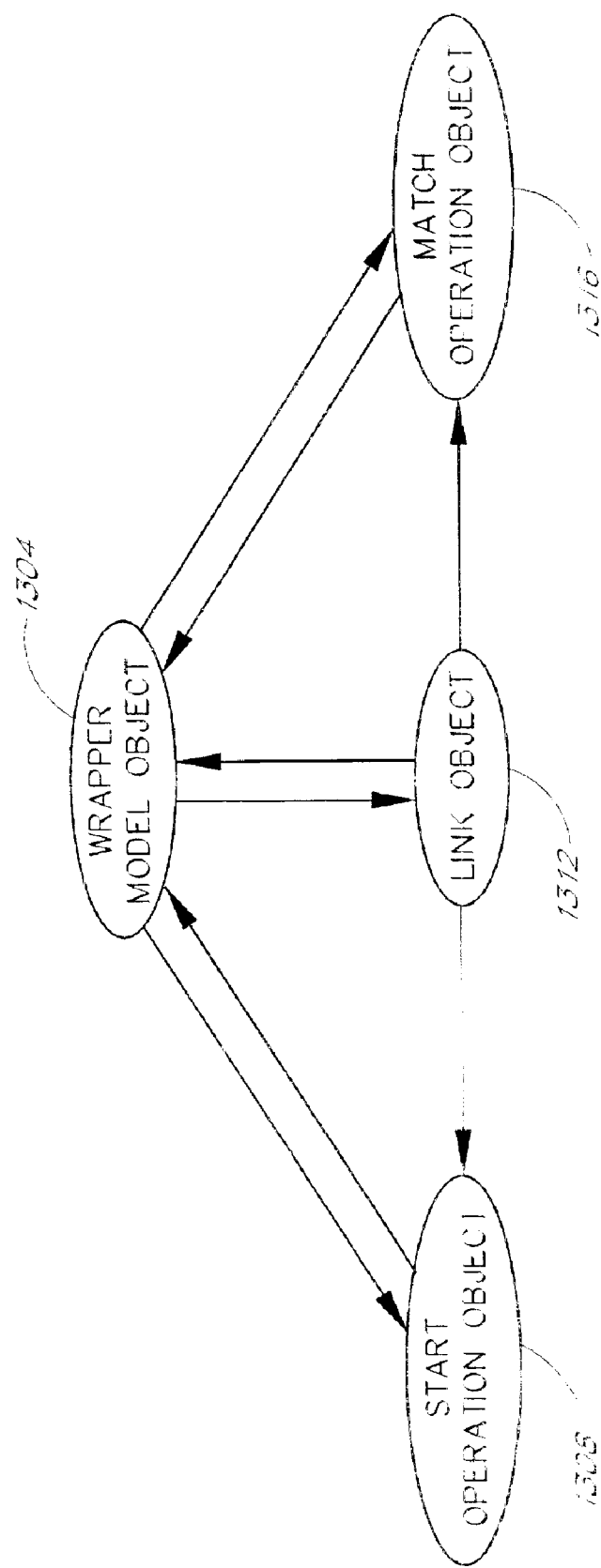
FIG. 13 illustrates an organization of objects from which a simple example wrapper is constructed.
Figure 134:
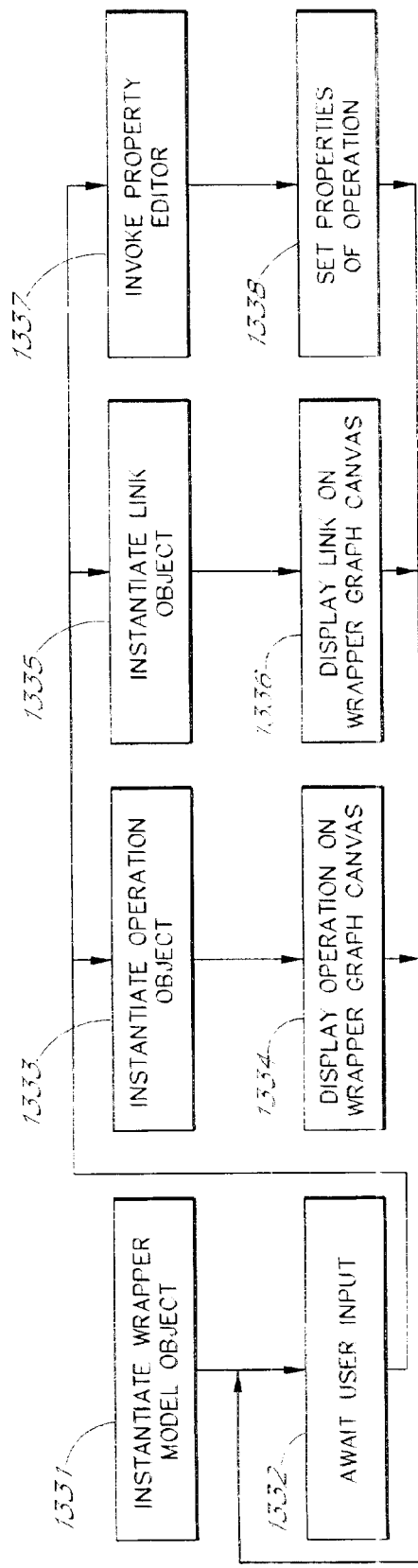

The wrapper model component 1150 creates a wrapper model from an instantiation of objects of the wrapper model class hierarchy. FIG. 13 illustrates an organization of objects that a very simple wrapper might comprise. The illustrated wrapper includes only two operations and one link.

Referring to FIG. 13, the Wrapper Model object 1304 is an instantiation of the Wrapper Model class 1260 and serves to identify the wrapper and its components. The Wrapper Model object 1304 includes references to the objects and links that the wrapper model comprises. In this case, the Wrapper Model object 1304 has references, indicated by directed arrows, to two operation objects 1308 and 1316. The operation objects include a Start operation object 1308, an instantiation of the Start class 1216, and a Match operation object 1316, an instantiation of the Match class 1220. The Wrapper Model also has a reference to a Link object 1312, again indicated by a directed arrow. Each operation object has a reference back to the Wrapper Model object 1304 so that the object can reference and call methods of the wrapper model with which it is associated. Similarly, the Link object 1213 also has a reference back to the Wrapper Model object 1304 so that it can reference and call methods of the wrapper model object 1304. The Start operation object 1308 serves as the source operation for the Link object 1312, and the Match operation object 1316 serves as the destination operation. The Link object 1312 has references to the source and destination operations as well as the associated Wrapper Model object 1304.

3. Class Methods

As discussed above, a wrapper is represented by an instantiation of the WrapperModel class 1260. Java code implementing one embodiment of the WrapperModel class 1260 is included in Appendix A. The WrapperModel class 1260 provides methods for setting and storing references to the operations and links from which it is composed. The class also provides a number of methods for running and debugging the wrapper. The methods comprise:

public WrapperModel( )//the constructor;
    public Operation getroot( )//returns the root (start) operation;
    public void setRoot(Operation op)//sets the root operation;
    public void addBreakpoint (Operation op)//adds a breakpoint at operation "op";
    public void removeBreakpoint(Operation op)//removes breakpoint from operation "op";
    public void addOperation(Operation operation)//adds operation to wrapper model;
    public void removeOperation(Operation operation)// removes operation from wrapper model;
    public Vector getOperations( )//returns the operation vector consisting of all the operations of the wrapper model;
    public void addLink(Link link)//adds link to wrapper model;
    public void removeLink(Link link)//removes link from wrapper model; and
    public Vector getlinks( )//returns the link vector consisting of all the links of the wrapper model.

The method:

public Operation getOperation(Operation operation, String linkname)

returns the destination operation associated with linkName. The source operation is passed in the "operation" parameter. Referring to FIG. 13, it will be noted that individual operation objects such as the Start operation object 1308, have no direct reference to their destination operations in the depicted embodiment. Thus, the source operation object, in this case the Start operation object 1308, uses its reference to the wrapper model object 1304, to call the WrapperModel method getOperation(operation, linkName). The getOperation method returns a reference to the destination Match operation object 1316. Operation objects use this method to retrieve a reference to the destination operation in order to make a call to the destination operation.

A number of additional methods of the WrapperModel class 1260 provide for identification of the operations, operation vectors, links, link vectors and the manipulation of aspects of the appearance of the wrapper model in the graphical user interface.

The WrapperElement class 1204 provides a basic wrapper element having functionality applicable to both links and operations. Java code implementing one embodiment of the WrapperElement class 1204 is included in Appendix B. The methods of the WrapperElement class 1204 comprise:

public WrapperElement( )//the constructor for an element instance;
    public void setLabel(String label)//sets the label of the element;
    public String getabel( )//returns the label of an element;
    public void setSelected(boolean selected)//sets whether or not the element is selected by the user for manipulation, setting of break points etc.;
    public boolean is Selected( )//returns whether the element is selected;
    public void setId(int id)//sets the id of the element;
    public int getId( )//returns the id of the element;
    public void setImageIcon(ImageIcon icon, int x, int y)// sets the image icon and the x,y position of the icon within the wrapper graph canvas;
    public void SetWrapperModel(WrapperModel model)// associates the wrapper element with the wrapper model to which it belongs; and
    public WrapperModel getWrapperModel( )//returns the wrapper model associated with the element.

The WrapperElement class 1204 also may include a number of other methods and a number of private variables within which data referenced by the above methods may be stored.

The Operation class 1212 serves as a superclass for all of the individual operation classes. Java code implementing one embodiment of the Operation class 1212 is included in Appendix C. The Operation class 1212 includes the methods that are common to and identically implemented for each individual operation.

Each individual operation provides a "call" method, to be discussed below, by which the individual operation is called during execution of the wrapper. The Operation class 1212 also provides the following "call" method that serves as a shell to catch exceptions and to call the "call" method of the individual operation:

public Environment call(Operation from, Operation op, Environment state).

This method, defined at the Operation class level, is just a shell method that encapsulates a call from an operation "from" to an operation "op" passing the environment "state." The shell method handles the case when the current operation is a break or cut point and if so takes the appropriate action by returning control to the user. Otherwise, the shell method then calls a "call" method of the individual operation "op." The shell call method returns the same environment returned by the individual call method of the "op" operation. This shell "call" method is used primarily to handle exceptions.

Other methods defined by the Operation class 1212 comprise:

public Operation( )//the constructor;
    public Vector getLinkNamesVector( ) //returns a vector of link names for an operation; and
    public Operation getOperation(String linkName).

The getOperation method returns the destination operation associated with a link with the label "linkName" for which the calling operation is the source operation. This method acts as a shell for and calls the getOperation method of the WrapperModel class 1260. It will be noted that link names are the Labels derived from the WrapperElement superclass of the Link class and will be addressed in the discussion of the Link class below. A number of additional methods of the Operation class 1212 provide for the manipulation of the appearance of the operation in the graphical user interface.

Each of the individual operation subclasses 1216, 1220, 1224, 1228, 1232, 1236, and 1240, implement the individual "call" method of the operation. The call method is called by the shell "call" method of the Operation class 1212, described above, but takes only one parameter—the wrapper variable execution environment. For each operation, the call method has the following format:

public Environment call(Environment state)

The call method implements the actual functionality of each individual operation as illustrated in FIGS. 8A–G. Upon completion, the method returns the environment "state" as modified by the operation in the course of execution.

The individual operation subclasses 1216, 1220, 1224, 1228, 1232, 1236, and 1240 also implement the method public String[ ] getLinkNames( ) that returns the set of link names for all of the links for which the calling operation serves as the source operation. This method is called by the getLinkNamesVector method of the Operation class 1212, discussed above.

Each operation subclass also has a constructor. Java code implementing one embodiment of the Match class 1220 is included in Appendix D.

Another subclass of the WrapperElement class 1204 is the Link class 1208, which links operations. Java code implementing one embodiment of the Link class 1208 is included in Appendix E. The Link class 1208 functions to identify the source operation and the destination operation associated with a link. In this manner, a directed graph is formed from the wrapper's operations. The methods provided by the Link class 1208 comprise:

public Link(Operation start, Operation end)//constructor for the Link class;
    public Operation getStartOperation( ) //returns the start operation; public void setStartOperation(Operation start)//sets the start operation;
    public void setEndOperation(Operation end)//sets the end operation; and
    public Operation getEndOperation( )//returns the end operation.

A number of additional methods provide for identification of the associated operations and the manipulation of aspects of the appearance of the link in the graphical user interface.

It will be noted that some of the methods of the above classes reference "link names." A link name is simply the label associated with a Link object as derived from its superclass, WrapperElement. The link name is set and retrieved using the WrapperElement methods, setLabel and getLabel as described above.

B. Wrapper Editor Component

In the preferred embodiment, the wrapper editor component 1130 provides the wrapper editor 702 user interface. The wrapper editor component 1130 also operates in conjunction with the wrapper model component 1150 to create an internal representation of a wrapper in the form of a wrapper model object.

FIG. 13A illustrates the process by which a wrapper model is created in a preferred embodiment of the present invention. At a step 1331 the wrapper editor component 1130 makes the appropriate calls to the wrapper model component 1150 to instantiate a wrapper model object. Once the wrapper model object has been created, the wrapper editor component 1130 can await user input at step 1332. The wrapper editor component will direct the user input to the appropriate step 1333, 1335, or 1337, depending on the character of the user input.

If the user input comprises a selection of a new operation, the wrapper editor component 1130 will pass control to a step 1333. At the step 1333, the wrapper editor component 1130 makes the appropriate calls to the wrapper model component 1150 to instantiate an operation object. At a next step 1334, the wrapper editor component 1130 displays a representation of the operation on the wrapper graph canvas 704.

If the user input comprises a selection of a new link, the wrapper editor component 1130 will pass control to a step 1335. At the step 1335, the wrapper editor component 1130 makes the appropriate calls to the wrapper model component 1150 to instantiate a link object. The wrapper editor component 1130 also initializes the new link object such that it references the appropriate source and destination objects indicated by the user input. At a next step 1336, the wrapper editor component 1130 displays a representation of the link on the wrapper graph canvas 704.

If the user input comprises the invocation of the property editor for a particular operation, the wrapper editor component 1130 will pass control to a step 1337. At the step 1337, the wrapper editor component 1130 calls the property editor, which displays the appropriate dialog box 708 for the corresponding operation. Once the user has entered the properties in the dialog box, control passes to step 1338. At step 1338, the wrapper editor component 1130 sets the properties of the corresponding operation object in accordance with the user input to the dialog box 708.

Once one of steps 1334, 1336, or 1338 has completed, the wrapper editor component 1130 passes control back to step 1332 for the processing of additional user input. The above-described process continues until the user has completed construction of the wrapper. At this point, the wrapper is represented internally within the wrapper builder application by the wrapper model component 1150. The wrapper can then be run, debugged, saved or otherwise manipulated by the wrapper builder application.

C. The Property Editor Component

The property editor component 1140 provides the pop up property editor dialog box 708 (FIG. 7) to the user upon the right clicking of an operation within the wrapper graph canvas 704. The property editor component 1140 allows the characteristics of each operation to defined. The property editor component takes as input an object of arbitrary class, and creates a panel with editable fields corresponding to each property of this object. The initial values of the object are displayed as preset fields and can be modified by a user. At any point in time a function getInstance( ) can be called to return the edited object. Only properties which are coded in the form setXXX( ) and getXXX( ) will be displayed in the property editor dialog box 708.

For example an instance of the following operation:

```
public class TestOperation
{
    public void setMatch(String match);
    String getMatch( );
    public void setIterate(Boolean iterate);
    Boolean getIterate( );
```

Will be displayed as follows in the property editor:

| Match | (enter string here) |
|---|---|
| Iterate | [x] (checkbox) |

The types used in the property editor are: String, Integer, Double, Boolean.

D. Wrapper Execution Component

The wrapper execution component 1160 runs the wrapper by calling the "call" method of a start operation object of a Wrapper Model object 1304. Each source operation then executes the code within its respective call method, which oftentimes results in the invocation of call methods of destination operations to which a source operation is linked. Upon completion of a call, control is returned to the source object. This process continues until control is returned to the start operation at which point execution of the wrapper has completed.

The wrapper execution component 1160 also provides the functionality of the wrapper builder's debug environment such as starting, stopping, and stepping through a wrapper. During the run and debug process, the wrapper execution component 1160 provides the debug frame 900. The wrapper execution component 1160 also uses the category file 600 to create the wrapper builder's SQL output during wrapper execution.

E. Wrapper Serialization Component and Wrapper Storage and Retrieval

An embodiment of the present invention already described provides for the creation of a wrapper using objects instantiated from a number of classes. The wrapper can be created and executed all in the environment provided by the wrapper builder. The wrapper serialization component 1170 provides for the storage and retrieval of wrappers in XML (Extensible Markup Language) through the process of Object Serialization. XML is a well-known file format widely used on the Web. It will be noted that object Serialization is well known in the art of Java programming. An excerpt from a Sun Microsystems Java web page summarizes the concept of serialization:

Object Serialization extends the core Java Input/Output classes with support for objects. Object Serialization supports the encoding of objects, and the objects reachable from them, into a stream of bytes; and it supports the complementary reconstruction of the object graph from the stream. Serialization is used for lightweight persistence and for communication via sockets or Remote Method Invocation (RMI). The default encoding of objects protects private and transient data, and supports the evolution of the classes.

(See http://java.sun.com/products/jdk/1.1/docs/guide/serialization/).

The wrapper builder application employs serialization to encode an internal object representation of a wrapper into XML format. The XML data can be saved as a wrapper file. Step 140 of flowchart 100 comprises the serialization process.

Once a wrapper file has been created and stored, the wrapper file can be read by a wrapper builder application and deserialized, by known methods, to reproduce the objects that the wrapper comprises. Alternatively, once a wrapper's development and testing is complete, it can be deployed for use. In this case, a wrapper execution engine, to be discussed below, can read the serialized wrapper, reproduce the wrapper within its execution environment, and run it.

F. Wrapper Builder Extensibility

The wrapper builder provides a basic set of operations. In one embodiment, however, the user is free to code additional operations using the Java language. When an operation is created for the first time, it is possible to add this operation to an operation palette by selecting the 'Import Operation' item from the 'Operation' menu of the wrapper editor.

The property editor can be configured to automatically determine the appropriate properties of the new operation class and present to the user appropriate fields in which to enter the properties. In the present embodiment, this automatic determination is accomplished through the capabilities of the Java Reflection libraries, which are available from Sun Microsystems. This is a known technique and there exist a number of property editors in a number of applications that use the Java Reflection Libraries. Currently, applicable property editors are provided by Java design products such as Borland's JBuilder, Symantec's Symantec Cafe, and Microsoft's Visual J++.

V. Wrapper Systems

The present invention contemplates a first system involving the wrapper builder application for the construction of wrappers. A second system will also be disclosed in which wrappers that have already been constructed using the wrapper builder application can be executed to perform the useful function of automatically retrieving and structuring Web site data.

A. Wrapper Builder System

FIG. 14 illustrates one embodiment of a system 1400 comprising the wrapper builder application 1100. The application 1100 is executed on a host computer 1404 and is connected to a communications port 1424 that provides access to the Internet or an intranet 1428 using the HTTP protocol over TCP/IP. The application 1100 accesses a Web site 1432, which is hosted by web servers 1436. The application 1100 can write a wrapper to or read a wrapper from a wrapper file 1412. The application 1100 can also write to or read from a category file 1416. The application 1100 links in or has compiled in the operation classes 1420 from which a wrapper's operations are instantiated.

One embodiment of the present invention comprises a wrapper builder application 1100 coded in the Java programming language. The application 1100 can be run on a computer with a Java interpreter, the computer and Java interpreter being referred to as a virtual machine.

B. Wrapper Execution System

Figure 15:
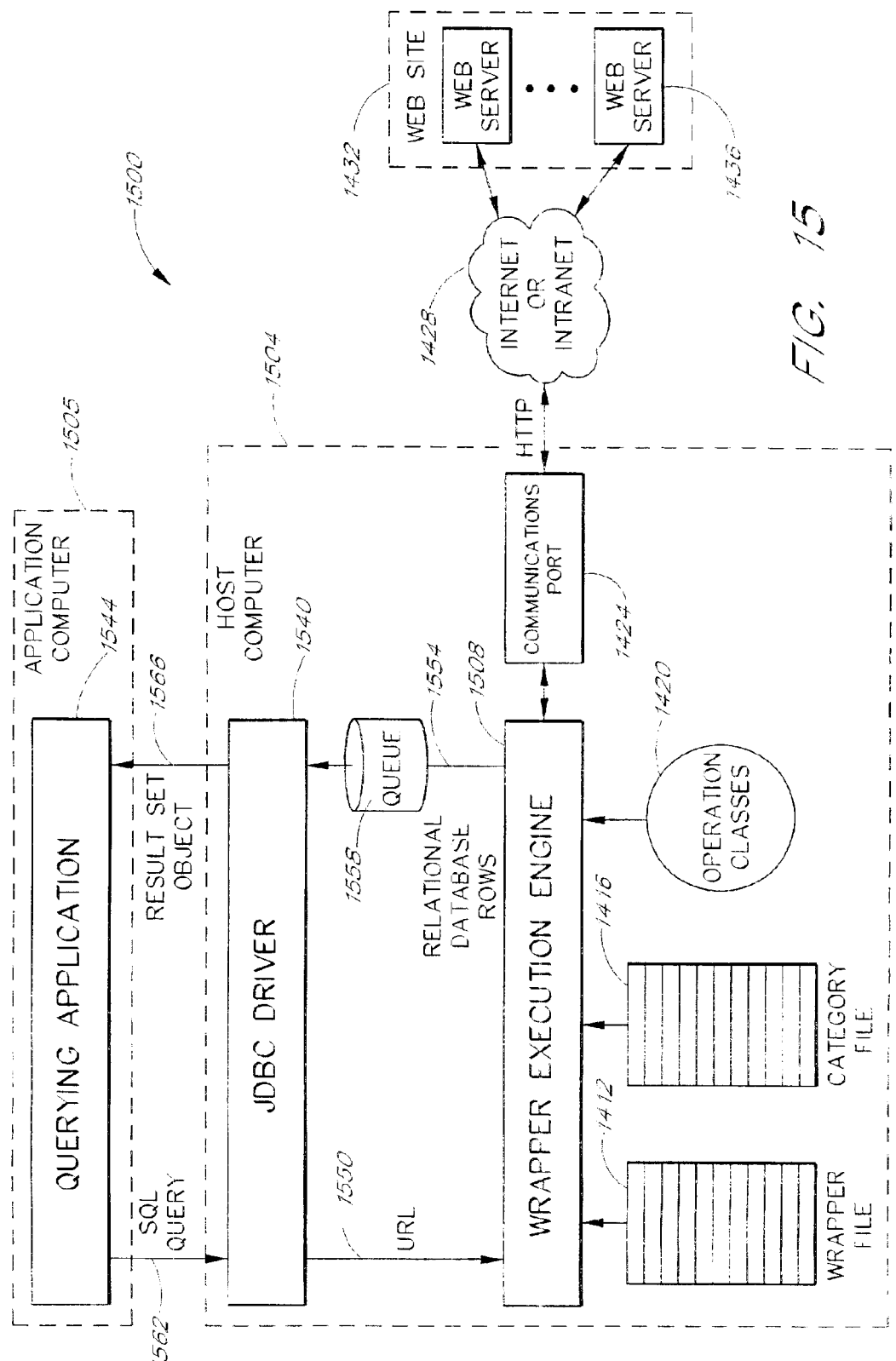
FIG. 15 illustrates one embodiment of a system in which a wrapper can be executed once it is constructed.

FIG. 15 illustrates a system 1500 in which a wrapper can be used once it is constructed. The system 1500 comprises a host computer 1504 that has access to the Web site of interest 1432. A wrapper execution engine 1508, running on the host computer 1504 executes the wrapper instead of the wrapper builder application 1100. The wrapper execution engine 1508 receives input comprising the wrapper file 1412, the category file 1416, and the operation classes 1420 from which the wrapper has been constructed. The wrapper execution engine 1508 interfaces with a Java database connectivity (JDBC) driver 1540. The JDBC driver serves as an interface to a querying application 1544.

The querying application 1544 executes on an application computer 1505 in communication with the host computer 1504. Although only one querying application 1544 and one application computer 1505 are shown, any number of querying applications and application computers could communicate with the host computer 1504. The querying application 1544 is preferably an application that is capable of making JDBC method calls. JDBC is a well-known application program interface (API) for accessing relational database systems. The JDBC driver interface 1540 to the wrapper execution engine 1508 makes the engine 1508 accessible in the same manner that relational databases are typically accessed by Java applications. The querying application 1544 sends an SQL query 1562 to the JDBC driver interface 1540. The JDBC driver 1540 returns a result set object 1566 containing the requested data retrieved from the Web site of interest 1432. The result set object 1566 is an object that provides methods by which its data can be accessed. Such objects are well known in the art and will not be described in detail herein.

The JDBC driver 1540 acts as a driver for the wrapper execution engine 1508. The driver 1540 calls the engine 1508 with the URL 1550 of the web site of interest 1432. At this point the engine 1508 loads the appropriate wrapper file 1412 and category file 1416. The wrapper execution engine 1508 can consist of a stripped down version of the wrapper builder application without the wrapper editing capabilities or graphical user interface. In place of the graphical user interface the of the wrapper builder, the wrapper execution engine 1508 can have an appropriate interface to the JDBC driver 1540.

Once the wrapper execution engine loads the wrapper file 1412 and category file 1416, it runs the wrapper (not illustrated), accessing the web site of interest 1432 through the communications port 1424. The wrapper produces relational database rows 1554 that are passed back to the JDBC driver 1540 through a queue 1558. The queue 1558 buffers the database rows 1554 to compensate for any difference in processing rates between the wrapper and the driver 1540.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is intended to be defined only by reference to the appended claims.

What is claimed is:

1. A method of generating a wrapper for extracting information from a repository of semistructured information, the method comprising the computer-implemented steps of:

presenting to a user a set of predefined operation types from which to construct the wrapper, the predefined set comprising operation types for extracting data from the repository based on structural relationships within the semistructured information, including operation types for retrieving web documents, following links within retrieved web documents, using match expressions to locate data items within the retrieved web documents, and extracting desired data items from the retrieved web documents for storage in a structured format;

presenting to the user an option to select operation types from the set and to specify properties of selected operation types, to allow the user to define operations to be performed by the wrapper;

monitoring and recording selections by the user of operation types and entry of operation properties, to generate the wrapper, wherein the wrapper is adapted to be executed to extract data from one or more web documents; and generating and displaying on a display screen a graphical representation of the wrapper in which wrapper operations are depicted as objects on the display screen.

2. The method of claim 1, further comprising presenting to the user an option to select operations depicted on the display screen to allow the user to define links between operations, wherein a link represents a call of a destination operation by a source operation.

3. The method of claim 2, wherein links are graphically depicted on the display screen.

4. The method of claim 3, wherein the repository comprises a Web site.

5. The method of claim 4, wherein the set of predefined operation types provides the capability of matching a regular expression.

6. The method of claim 5, wherein the generated wrapper is configured to output extracted data in a structured format.

7. The method of claim 6, further comprising visually depicting execution of the wrapper through the graphical representation of the wrapper.

8. The method of claim 7, further comprising displaying output of the wrapper.

9. The method of claim 8, further comprising displaying data extracted from the semistructured information by the wrapper.

10. The method of claim 9, further comprising performing a statistical analysis on the output of the wrapper.

11. A method of generating a wrapper for extracting data from a Web site, the method comprising:

invoking an application, the application providing a graphical design environment in which the wrapper can be graphically represented;

using the application to create objects in the graphical design environment, the objects representing operations for extracting data from a Web site based on structural relationships within the Web site, including operations for retrieving web documents of the Web site, following one or more links within the retrieved web documents, using match expressions to locate desired data within the retrieved web documents, and extracting desired data from one or more of the retrieved web documents; and using the application to create links between the objects in the graphical design environment, wherein a link represents a call of a destination operation by a source operation, and wherein the wrapper comprises the operations and the calls.

12. The method of claim 11, further comprising using the application to debug the wrapper.

13. The method of claim 12, further comprising:
using the application to execute the wrapper; and
using the application to display the data extracted from the Web site in a structured format.

14. The method of claim 13, further comprising using the application to examine the Web site to identify information of interest.

15. The method of claim 11, further comprising defining a structured format in which the wrapper can output the information.

16. A computer program for facilitating the design and creation of a wrapper, the computer program comprising, on a computer readable medium:
wrapper editor code which provides a graphical design environment in which a wrapper can be graphically constructed;
wrapper rendering code which displays a graphical representation of the wrapper within the graphical design environment as the wrapper is constructed; and
operation class code which defines a set of wrapper operation classes for extracting data from semistructured information based on structural relationships within the semistructured information, including operation classes for retrieving web documents, following links within retrieved web documents, locating data items within the retrieved web documents, and extracting desired data items from the retrieved web documents:
wherein the wrapper editor code, wrapper rendering code, and operation class code collectively provide a wrapper development environment which enables users to graphically construct executable wrappers for extracting data from web pages without writing executable wrapper code.

17. The computer program of claim 16, wherein the semistructured information comprises a Web site.

18. The computer program of claim 17, further comprising table display code which displays information extracted from the Web site.

19. The computer program of claim 18, further comprising wrapper run code which enables the execution of the wrapper.

20. The computer program of claim 19, further comprising wrapper debugging code.

21. The computer program of claim 20, wherein the set of operation classes enable the structuring of extracted data.

22. The computer program of claim 21, wherein the wrapper debugging code provides options for controlling the execution of the wrapper, the options comprising starting the wrapper, stopping the wrapper, and setting breakpoints.

23. The computer program of claim 22, wherein the wrapper debugging code provides options for displaying transitory data produced by the wrapper during execution.

24. The computer program of claim 22, further comprising Web viewer code which displays Web pages.

25. A method of executing a wrapper, the method comprising:
creating an instance of a wrapper within an internal memory of a computer, the wrapper facilitating the automated extraction of information from a Web site and including operations for retrieving web documents of the Web site, using matching expressions to locate data items within the retrieved web documents, and extracting data items from the retrieved web documents;
providing a graphical representation of the wrapper on a display screen;
providing a user interface through which a user can control the execution of the wrapper;
monitoring the user interface for user input;
controlling the execution the wrapper in response to user input;
graphically depicting the execution of the wrapper through the graphical representation of the wrapper; and
displaying information extracted from the Web site as a result of said execution of the wrapper.

26. The method of claim 25, further comprising:
graphically depicting objects on the display screen, the objects representing operations to be performed by the wrapper; and
graphically depicting links between objects on the display screen, wherein a link represents a call of a destination operation by a source operation.

27. The method of claim 26, wherein the user interface provides to the user options for controlling the execution of the wrapper, the options comprising starting the wrapper, stopping the wrapper, and setting breakpoints at operations.

28. The method of claim 27, further comprising performing a statistical analysis on an output of the wrapper.

29. The method of claim 27, wherein the wrapper is configured to output extracted information in a structured format.

30. The method of claim 1, wherein the operation types include an operation for submitting HTML forms and associated form data to a web server.

31. The method of claim 1, further comprising presenting to the user an option to associate the wrapper with a file that specifies a structured format for storing data extracted by the wrapper.

32. The method of claim 11, further comprising associating the wrapper with a structured data format in which data extracted by the wrapper is to be stored by the application.

33. A wrapper development system, comprising, within a computer readable medium or memory:
a set of operation classes that define a set of available wrapper operations, including operations that provide functionality for retrieving web documents, following links within retrieved web documents, using match expressions to locate data items within the retrieved web documents, and extracting data items from retrieved web documents; and
a user interface that provides functionality for a user to create a wrapper by at least (1) selecting wrapper operations from said set to create instances of selected wrapper operations, (2) editing properties of the instances of the selected wrapper operations to specify actions to be performed by the wrapper, and (3) interconnecting the instances of the wrapper operations to specify an order in which the actions are to be performed, wherein the user interface graphically depicts each instance of a wrapper operation as a corresponding display object that is selectable to edit corresponding properties;

wherein the user interface further includes functionality for associating a wrapper with a structured data format in which data extracted by the wrapper is to be stored.

34. The wrapper development system of claim 33, wherein the user interface provides functionality for including within a wrapper a call from one instance of a wrapper operation to another instance of a wrapper operation.

35. The wrapper development system of claim 33, further comprising a wrapper execution engine that executes the wrappers, wherein the user interface visually depicts execution of a wrapper by highlighting the corresponding display objects.

36. The wrapper development system of claim 33, wherein the set of available wrapper operations includes an operation for submitting HTML forms and associated form data to a web server.

37. The wrapper development system of claim 33, wherein the user interface further includes a web viewer that displays HTML coding of web documents, and provides a match function for interactively searching the HTML coding, to facilitate generation of a wrapper.

38. The wrapper development system of claim 37, wherein the web viewer additionally displays a tree view of a web site being browsed.

39. The wrapper development system of claim 37, further comprising a statistical analysis tool that analyzes data extracted during wrapper execution to evaluate whether the wrapper execution was successful.

* * * * *

UNITED STATES PATENT AND TRADEMARK OFFICE
CERTIFICATE OF CORRECTION

PATENT NO.     : 6,851,089 B1
DATED          : February 1, 2005
INVENTOR(S)    : Erickson et al.

It is certified that error appears in the above-identified patent and that said Letters Patent is hereby corrected as shown below:

Column 3,
Line 8, after "application" insert -- . --.

Column 6,
Line 39, replace "nm/debug" with -- run/debug

Column 7,
Line 51, after "list of" insert -- URLs. --.

Column 15,
Line 12, replace "8B" with -- 8E --.

Column 19,
Line 25, replace "<P>" with -- </P> --.

Column 22,
Line 43, replace "getabel" with -- getLabel --.

Column 23,
Line 51, after "method" insert -- : --.

Column 26,
Lines 2-3, replace "sunmarizes" with -- summarizes --.

Column 29,
Line 36, replace ":" with -- ; --.

UNITED STATES PATENT AND TRADEMARK OFFICE
CERTIFICATE OF CORRECTION

PATENT NO. : 6,851,089 B1
DATED : February 1, 2005
INVENTOR(S) : Erickson et al.

It is certified that error appears in the above-identified patent and that said Letters Patent is hereby corrected as shown below:

<u>Column 30,</u>
Line 12, after "controlling the execution" insert -- of --.

Signed and Sealed this

Thirteenth Day of June, 2006

JON W. DUDAS
*Director of the United States Patent and Trademark Office*